(12) United States Patent
Li

(10) Patent No.: US 11,599,849 B2
(45) Date of Patent: Mar. 7, 2023

(54) SELF-SERVICE OPERATING SYSTEM AND METHOD, AND OPERATION DOOR

(71) Applicant: BEIJING GEEKPLUS TECHNOLOGY CO., LTD., Beijing (CN)

(72) Inventor: Hongbo Li, Beijing (CN)

(73) Assignee: BEIJING GEEKPLUS TECHNOLOGY CO., LTD., Beijing (CN)

( * ) Notice: Subject to any disclaimer, the term of this patent is extended or adjusted under 35 U.S.C. 154(b) by 89 days.

(21) Appl. No.: 16/920,445

(22) Filed: Jul. 3, 2020

(65) Prior Publication Data

US 2020/0334625 A1 Oct. 22, 2020

Related U.S. Application Data

(63) Continuation of application No. PCT/CN2019/095440, filed on Jul. 10, 2019.

(30) Foreign Application Priority Data

Aug. 21, 2018 (CN) .......................... 201810954840.X

(51) Int. Cl.
*G06Q 10/08* (2012.01)
*G06Q 10/087* (2023.01)
(Continued)

(52) U.S. Cl.
CPC ......... *G06Q 10/087* (2013.01); *G05D 1/0027* (2013.01); *G06Q 10/0836* (2013.01); *G06Q 20/401* (2013.01); *G05D 2201/0216* (2013.01)

(58) Field of Classification Search
None
See application file for complete search history.

(56) References Cited

U.S. PATENT DOCUMENTS 5,510,984 A * 4/1996 Markin ................ G05D 1/0265
701/87
9,120,624 B1 * 9/2015 Cassady ............. G06Q 10/0836
(Continued)

FOREIGN PATENT DOCUMENTS

CN 105540125 A 5/2016
CN 106185152 A 12/2016
(Continued)

OTHER PUBLICATIONS

JPO, Office Action for JP Application No. 2020-540354, dated Jan. 7, 2021.
(Continued)

*Primary Examiner* — Fateh M Obaid
(74) *Attorney, Agent, or Firm* — Hodgson Russ LLP

(57) ABSTRACT

A self-service operating system and method, and an operation door. The system comprises: a control server, one or more operation doors, at least one robot, and one or more storage containers, wherein the control server is configured to respond to an item operation instruction, determine a target storage container and a target operation door which corresponds to an item to be operated, and send a carrying instruction to the robot; the robot is configured to respond to the carrying instruction to carry the target storage container to the target operation door, and a plurality of box openings on the target storage container respectively correspond to a plurality of box openings on the target operation door on a one-to-one basis; and the control server is further configured to control a box opening door of a target box opening on the target operation door to open.

17 Claims, 11 Drawing Sheets

(51) Int. Cl.
*G05D 1/00* (2006.01)
*G06Q 10/0836* (2023.01)
*G06Q 20/40* (2012.01)

(56) References Cited

U.S. PATENT DOCUMENTS

| | | | |
|---|---|---|---|
| 9,411,337 B1* | 8/2016 | Theobald | G05D 1/0225 |
| 9,463,927 B1* | 10/2016 | Theobald | B65G 1/1373 |
| 9,466,046 B1* | 10/2016 | Theobald | G06Q 10/087 |
| 9,489,490 B1* | 11/2016 | Theobald | G16H 20/13 |
| 9,701,012 B1* | 7/2017 | Theobald | G05B 19/41815 |
| 9,720,414 B1* | 8/2017 | Theobald | B25J 5/007 |
| 10,168,699 B1* | 1/2019 | Theobald | G05D 1/0088 |
| 10,556,334 B1* | 2/2020 | Theobald | G05D 1/0223 |
| 10,611,520 B2* | 4/2020 | Sussman | B65D 21/0224 |
| 10,899,543 B2* | 1/2021 | Pompen | G07F 17/10 |
| 11,136,008 B2* | 10/2021 | Lai | G06Q 10/06315 |
| 11,194,337 B2* | 12/2021 | Liu | B07C 3/10 |
| 11,213,950 B2* | 1/2022 | Johnson | B25J 9/1666 |
| 2004/0019406 A1* | 1/2004 | Wang | H04N 7/142 |
| | | | 700/231 |
| 2007/0129849 A1* | 6/2007 | Zini | G05D 1/0261 |
| | | | 700/258 |
| 2010/0234995 A1* | 9/2010 | Zini | B25J 11/009 |
| | | | 700/258 |
| 2011/0160948 A1* | 6/2011 | Bailey | G05D 1/0259 |
| | | | 700/236 |
| 2013/0317642 A1* | 11/2013 | Asaria | G06Q 50/28 |
| | | | 700/216 |
| 2014/0333190 A1* | 11/2014 | Kim | G05D 1/0287 |
| | | | 312/400 |
| 2016/0167227 A1* | 6/2016 | Wellman | B65G 1/0492 |
| | | | 901/3 |
| 2017/0038776 A1* | 2/2017 | Gariepy | G05D 1/0022 |
| 2018/0244469 A1* | 8/2018 | Testa | G07F 11/165 |

FOREIGN PATENT DOCUMENTS

| | | |
|---|---|---|
| CN | 206032359 U | 3/2017 |
| CN | 106956883 A | 7/2017 |
| CN | 107108122 A | 8/2017 |
| CN | 107444825 A | 12/2017 |
| CN | 107600856 A | 1/2018 |
| CN | 108806115 A | 11/2018 |
| JP | 2016055963 A | 4/2016 |
| JP | 2016535376 A | 11/2016 |
| JP | 2018052742 A | 4/2018 |
| WO | 2013148123 A1 | 10/2013 |

OTHER PUBLICATIONS

KIPRIS, Office Action for KR Application No. 10-2021-7005254, dated Nov. 11, 2021.
EPO, European Search Report and Opinion for EP Application No. 19851554.6, dated Mar. 25, 2022.

* cited by examiner

SELF-SERVICE OPERATING SYSTEM AND METHOD, AND OPERATION DOOR

CROSS REFERENCES TO RELATED APPLICATIONS

This application is the continuation application of International Application No. PCT/CN2019/095440, filed on Jul. 10, 2019, which is based upon and claims priority to Chinese Patent Application No. 201810954840.X, filed on Aug. 21, 2018, the entire contents of which are incorporated herein by reference.

TECHNICAL FIELD

Embodiments of the present application relate to the field of warehousing technology, for example, to a self-service operating system and method, and an operation door.

BACKGROUND

With the rapid economic development, warehousing technology has been applied to many industries in life, such as unmanned access cabinets in the express delivery industry or unmanned supermarkets. Therefore, how to quickly and efficiently perform operations of articles (such as storage and retrieval, or sale) in an unmanned mode is extremely important for the development of the unmanned mode.

In the related technology, using an unmanned supermarket as an example, commodity shelves are fixedly arranged in the supermarket, and a user walks among multiple commodity shelves in the supermarket according to commodities he wants to buy, and after scanning two-dimensional codes of the commodities on the shelf and paying for them, he can get the corresponding commodities.

However, the related technology has a unitary operation mode and relies highly on manpower, and a customer needs to constantly walk among commodity shelves, so that a lot of time and energy of the user are consumed, and quickness and high efficiency are not achieved really.

SUMMARY

Embodiments of the present application provide a self-service operating system and method, and an operation door, capable of automated unmanned operations according to external needs, thereby improving operation efficiency, and achieving quickness and efficiency.

In an embodiment, the embodiment of the present application provides a self-service operating system, including a control server, one or more operation doors, at least one robot, and one or more storage containers, where the one or more storage containers are located in a storage zone, and at least one side of the storage zone is provided with the one or more operation doors; the at least one robot and the one or more operation doors are respectively communicatively connected with the control server, and the one or more operation doors and the one or more storage containers are each provided with a plurality of compartments, the plurality of compartments on each of the storage containers respectively containing articles, and the plurality of compartments on each of the operation doors being correspondingly provided with compartment doors respectively, where the control server is configured to, in response to an article operation instruction, determine a target storage container and a target operation door corresponding to an article to be operated, and transmit a transfer instruction to a first robot of the at least one robot; the first robot is configured to, in response to the transfer instruction, transfer the target storage container to the target operation door, where a plurality of compartments on the target storage container are in one-to-one correspondence with a plurality of compartments on the target operation door respectively; and the control server is further configured to control a compartment door of a target compartment on the target operation door to open, the target compartment on the target operation door being a compartment corresponding to a compartment on the target storage container associated with the article to be operated, to achieve an article operation on the target storage container.

In an embodiment, the embodiment of the present application provides a self-service operating method, including: a control server determining a target storage container and a target operation door corresponding to an article to be operated among one or more storage containers and one or more operation doors according to an article operation instruction, and transmitting a transfer instruction to a first robot; the first robot transporting the target storage container to the target operation door according to the transport instruction, where a plurality of compartments on the target storage container are in one-to-one correspondence with a plurality of compartments on the target operation door respectively; and the control server controlling compartment doors of one or more target compartments on the target operation door to open, the one or more target compartments on the target operation door being compartments corresponding to compartments on the target storage container associated with the article to be operated, to achieve an article operation on the target storage container.

In an embodiment, the embodiment of the present application provides an operation door, including a control module, a communication module, a door frame, and a door body connected with the door frame, the door body having a plurality of compartments provided thereon, and the plurality of compartments being correspondingly provided with compartment doors respectively; and the communication module being in communication connected with a control server, where the communication module is configured to receive a control message sent by the control server, the control message indicating a compartment, a compartment door of which is to be opened, of the plurality of compartments; and the control module is configured to control, according to the control message, the compartment door of any one or more of the plurality of compartments to open.

DETAILED DESCRIPTION OF THE EMBODIMENTS

Figure 1:
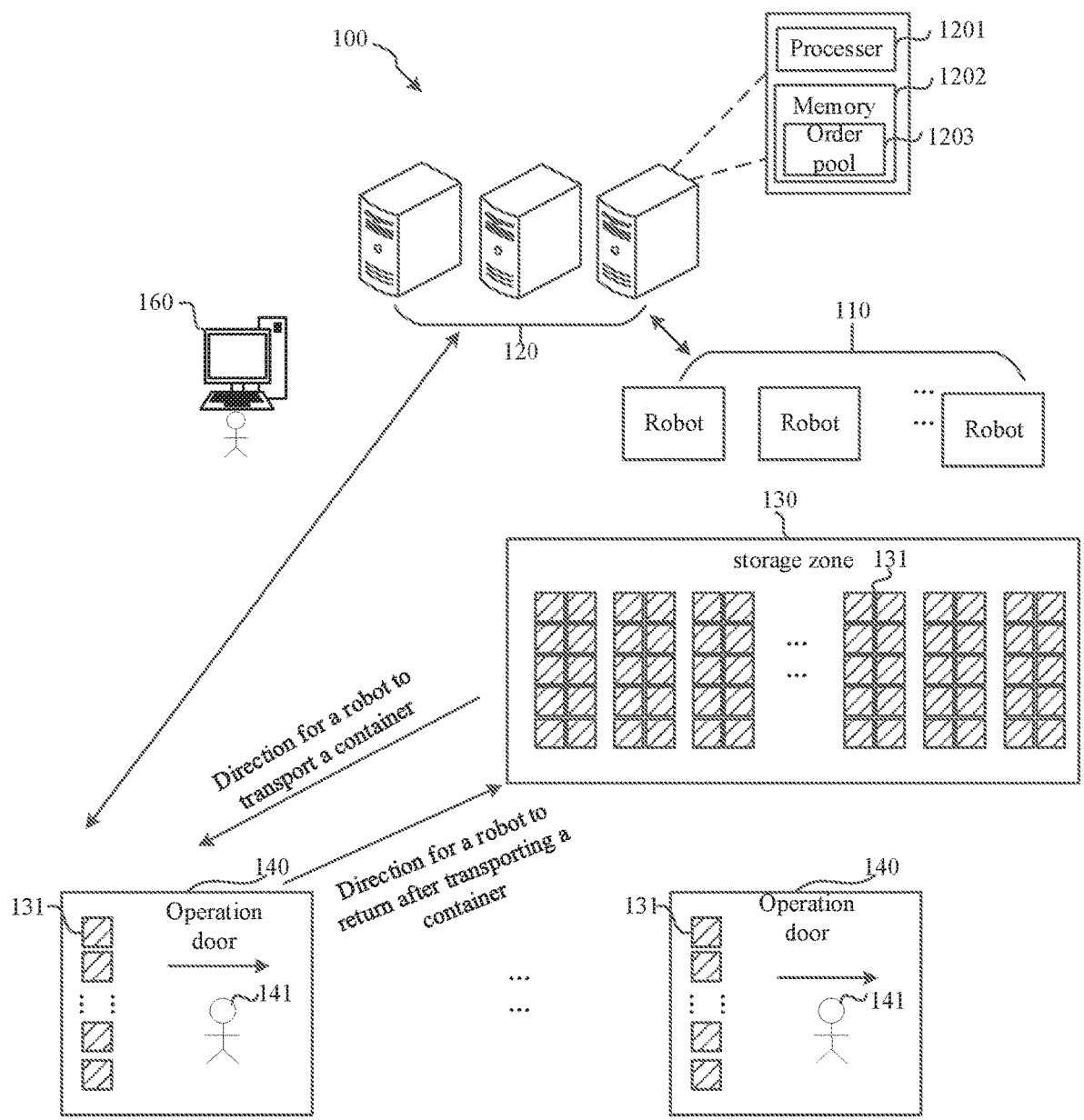
FIG. 1 is a system structure diagram of a self-service operating system provided in an embodiment of the present application.

Embodiments of the present application are further described in detail below in conjunction with the accompanying drawings and embodiments. It can be understood that the embodiments described herein are only used for explaining the embodiments of the present application, rather than limiting the present application. For convenience of description, only parts related to the embodiments of the present application, instead of the entire structure, are shown in the drawings.

Figure 2:
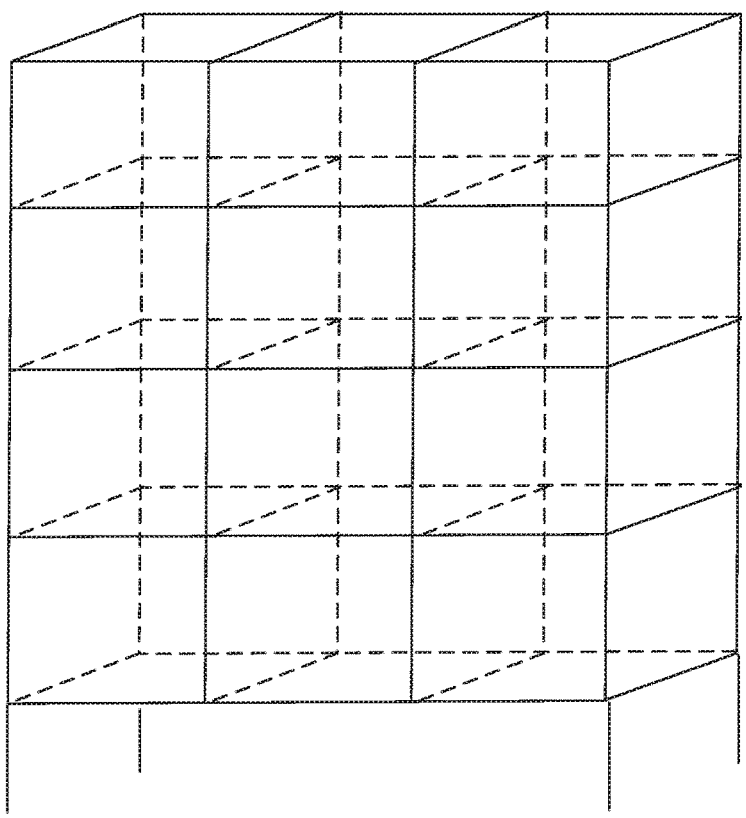
FIG. 2 is a schematic diagram of a shelf open on one side provided in an embodiment of the present application.

FIG. 1 is a system structure diagram of a self-service operating system provided in an embodiment of the present application. Referring to FIG. 1, the system 100 includes robots 110, a control system 120, a storage zone 130 and an operation door 140. The storage zone 130 is provided with a plurality of storage containers 131, and one or more types of articles are placed on the storage containers 131. A plurality of storage containers 131 are arranged in the form of an array, like shelves with various goods placed thereon as seen in a supermarket for example. Generally, a plurality of operation doors 140 are provided on one or more sides (such as one side as shown in the figure) of the storage zone 130. The storage container 131 is a container having compartments and capable of storing articles by the compartments, such as a shelf, the shelf including a plurality of partition layers and four floor-standing support columns, each partition layer of the shelf having at least one compartment, in which one or more articles can be placed. Furthermore, the shelf may be open on one side, such as a shelf open on one side shown in FIG. 2, or may also be open on two sides, in which articles in any of the two open sides of the shelf can be operated by rotating the shelf.

The control system 120 communicates with the robot 110 wirelessly. A working person (or user) uses an operation console 160 to generate an order, and the order is then transmitted to the control system 120. The control system 120 responds to the order and starts work. The robot 110 performs a transport task under the control of the control system 120. For example, using a storage container being a shelf as an example, the robot 110 can travel along an empty space (a part of a passageway of the robot 110) in the shelf array, move to the bottom of the shelf, lift the shelf by using a lifting mechanism, and transport the shelf to an allocated operation door 140.

In an example, the robot 110 has a lifting mechanism and an autonomous navigation function. The robot 110 can travel to the bottom of the shelf and use the lifting mechanism to lift the entire shelf so that the shelf can move up and down with the lifting mechanism having a lifting function. In an example, the robot 110 can travel according to two-dimensional code information captured by a camera, and can travel to the underside of the shelf prompted by the control system 120 according to a path determined by the control system 120. The robot 110 transports the shelf to the operation door 140, and a working person (or user) 141 takes out an article from the shelf at the operation door 140. For a shelf with two open sides, the robot 110 can rotate the shelf so that the direction of the open side where the article to be picked is located faces the person who picks the article, such as a working person or user.

The control system 120 is a software system running on a control server and having data storage and information processing capabilities, and can be connected to the robot, a hardware input system, and other software systems in a wireless or wired manner. The control system 120 can include one or more control servers, and can be a centralized control architecture or a distributed computing architecture. The control server has a processor 1201 and a memory 1202, and an order pool 1203 can be provided in the memory 1202.

The system shown in FIG. 1 can be applied to various suitable scenarios. For example, in a sorting scenario, after the robot 110 transports a storage container 131 to an operation door 140, a working person takes out an article (which is an order article) from the storage container 131 and puts it into a packing box for packing. As another example, in an article preservation scenario, no matter for temporary preservation or long-term preservation of an article, after the robot 110 transports a storage container 131 to an operation door 140, a working person or article owner takes out the article from the storage container 131 or puts the article into the storage container 131. In particular, it is to be noted that in the article preservation scenario, to ensure privacy and safety, one storage container 131 may be specially used for placing one user's article, or one compartment may be specially used for placing one user's article. Of course, in addition to this, the system is also applicable to unmanned access scenarios and unmanned supermarket scenarios.

Figure 3:
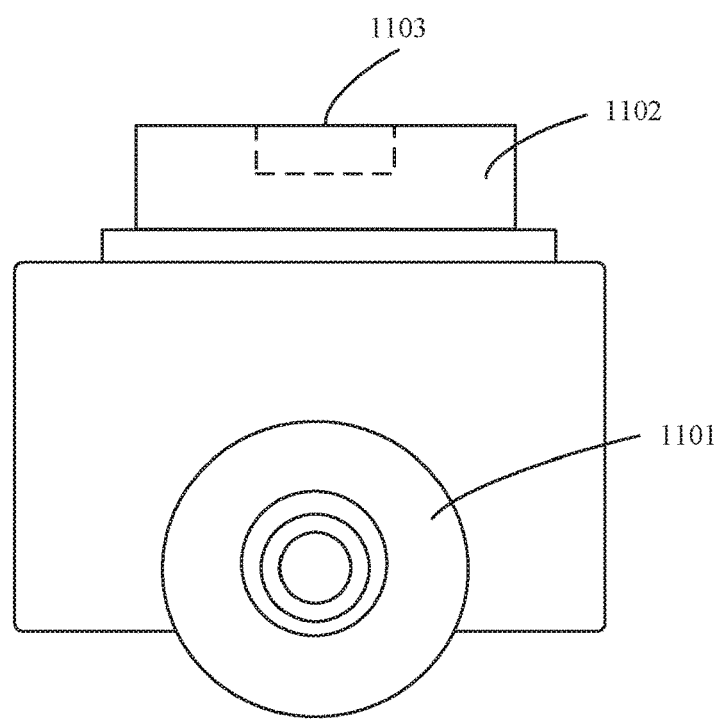
FIG. 3 is a schematic diagram of a shelf provided by an embodiment of the present application.

Referring to FIG. 3, the robot 110 can include a driving mechanism 1101, through which the robot 110 can move within a work space. The robot 110 can further include a lifting mechanism 1102 for transporting a storage container 131, and the robot 110 can move to the underside of the storage container 131, lift the storage container 131 by using the lifting mechanism 1102, and transport the storage container 131 to an allocated operation door 140. When the lifting mechanism 1102 rises, the entire storage container 131 is lifted from the ground, so that the robot 110 transports the storage container 131, and places the storage container 131 on the ground when the lifting mechanism 1102 falls. A target identification component 1103 of the robot 110 can effectively identify the storage container 131 when the robot 110 lifts the storage container 131.

In addition, if it is based on visual navigation, the robot 110 further includes a navigation identification component (not shown in FIG. 3), which is configured to identify a navigation mark (such as a two-dimensional code) on the paved ground. Of course, the robot 110 also includes a control module (not shown in FIG. 3) that controls the entire robot 110 to implement functions such as motion and navigation. In an example, the robot 110 at least includes two cameras, one of which faces upward and the other faces downward, and the robot 110 can travel forward according to two-dimensional code information (or other ground identifier) captured by the downward camera, and can travel to the underside of the storage container 131 prompted by the control system 120 according to a path determined by the control system 120.

Related technologies are all based on manual operation, adopt a unitary operation mode, and rely highly on manpower, and customers need to constantly walk among goods shelves to perform operations, which consumes a lot of time and energy of customers, and leads to low work efficiency. Therefore, embodiments of the present application improve the traditional way of operation in respect of an interactive mode to achieve an automated unmanned operation model.

The self-service operating system and method, and operation door provided in the embodiments of the present application are described in detail below through the embodiments.

Embodiment I

Figure 4:
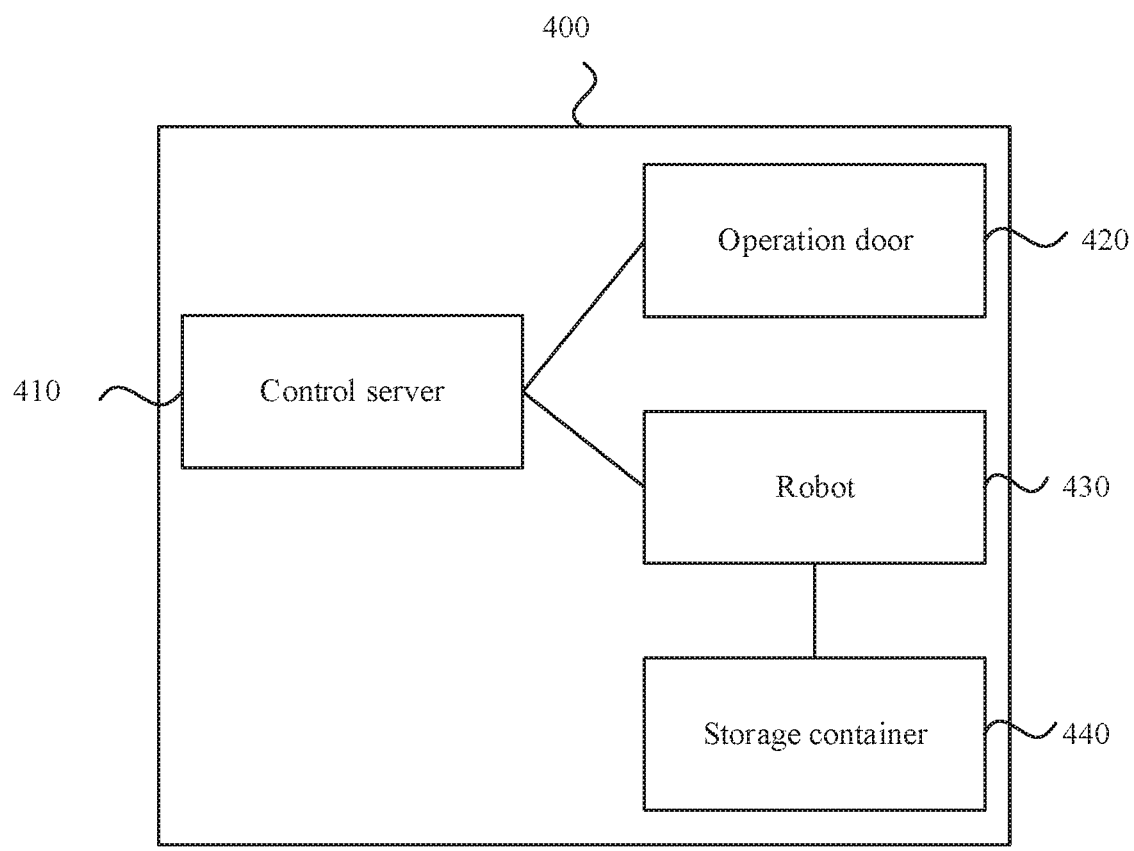
FIG. 4 is a structural block diagram of a self-service operating system provided in Embodiment I of the present application.

FIG. 4 is a structural block diagram of a self-service operating system provided in Embodiment I of the present application. To explain the solution of this embodiment more clearly, using an unmanned supermarket scenario as an example for description in this embodiment, as shown in FIG. 4, the system can implement the unmanned autonomous operating system described in any embodiment of the present application. The system 400 includes a control server 410, one or more operation doors 420, at least one robot 430, and one or more storage containers 440, where the one or more storage containers 440 are located in a storage zone, and at least one side of the storage zone is provided with one or more operation doors 420; the one or more operation doors 420 and the at least one robot 430 are respectively communicatively connected with the control server 410, and the one or more operation doors 420 and the one or more storage containers 440 are each provided with a plurality of compartments, the plurality of compartments on each of the storage containers 440 respectively containing articles, and the plurality of compartments on each of the operation doors 420 being correspondingly provided with compartment doors respectively.

The control server 410 is configured to, in response to an article operation instruction, determine a target storage container 440 and a target operation door 420 corresponding to an article to be operated, and transmit a transport instruction to a robot 430.

The robot 430 is configured to, in response to the transport instruction, transport the target storage container 440 to the target operation door 420, where a plurality of compartments on the target storage container 440 are in one-to-one correspondence with a plurality of compartments on the target operation door 420.

The control server 410 is further configured to control a compartment door of a target compartment on the target operation door 420 to open, the target compartment on the target operation door 420 being a compartment corresponding to a compartment on the target storage container 440 associated with the article to be operated, to achieve an article operation on the target storage container 440.

In different application scenarios, the specific reference of the compartment associated with the article to be operated is also different. For example, in an unmanned supermarket scenario, the compartment associated with the article to be operated refers to a compartment where a commodity for sale is located or a compartment where a replenishment commodity is racked; in an unmanned storage and retrieval scenario, the compartment associated with the article to operated refers to a compartment from which an article is taken out or a compartment into which an article is stored; and in a sorting scenario, the compartment associated with the article to operated refers to a compartment where an article is sorted or taken stock, or a compartment where a replenishment article is racked, etc.

In a specific embodiment of the present application, the storage container can be a container configured to store articles, such as a shelf, in a scenario involving article operation, such as in a storage zone of a warehouse, a self-service shopping zone of a shopping mall or office building, or a package collecting zone. The shelf can include a plurality of partition layers, where each partition layer can include a plurality of compartments, and a plurality of articles can be placed in each compartment. Moreover, the shelf can be open on one side or on two sides. Articles in the compartments on different open sides can be handled by selecting the orientation of the shelf. In an embodiment, the position of the target compartment in the storage zone can be determined according to the position of the storage container and the position of the target compartment in the storage container, and then the position of the article to be operated in the storage zone can be determined according to an association relationship between the target compartment and the article to be operated therein.

Furthermore, in this embodiment, a popularity level of at least one storage container in the storage zone can be determined according to a hit rate of one or more articles in the at least one storage container based on a preset period; and then the position of the storage container in the storage zone is adjusted according to the popularity level of the at least one storage container. In this way, a storage container with a higher popularity level is placed closer to an operation door, which facilitates rapid transport of a corresponding storage container in the case of a high hit rate.

In this embodiment, the operation door refers to a fixed spacer provided between a user and a storage container in a user interaction zone. The interaction zone can include one or more operation doors, where each operation door includes at least one compartment door respectively in one-two-one correspondence with a compartment on a corresponding storage container, and the opening and closing of each compartment door are controlled by the control server. When a storage container is placed on a side of a compartment door and the compartment door is open, the user can operate a compartment of the storage container behind the compartment door.

In this embodiment, the operation door can configure the compartment door thereon according to the specific structure of the storage container. In view of the uniformity and universality of the operation door, storage containers of the same model can be used in the storage zone to ensure that each storage container can correspond to the operation door. For such storage containers as a shelf, in an embodiment, the shelf and the compartment are configured based on a unified standard; that is, the sizes of different shelves, the configuration of their compartments, and the positions and sizes of the corresponding compartments are completely same. For a shelf with two open sides, the aforementioned unified standard is adopted on both sides. Therefore, the shelves in this embodiment are completely same when no articles are placed thereon. Correspondingly, based on the size of the shelf and the same configuration, the operation door is provided with a compartment door configured for each compartment at a position corresponding to the compartment, on a plate material not smaller than the overall size of the shelf. Hence, each shelf in the storage zone can be transported to the back of the operation door and aligned with the operation door, such that the compartments capable of loading articles in the shelf correspond to the corresponding compartment doors in a one-to-one manner. Only when a compartment door is open can the user see and handle a compartment corresponding to the compartment door. Among the plurality of compartment doors, at least one can be opened under the control of the control server, or all of them can be opened under the control of the control server. Optionally, multiple forms of shelves and operation doors corresponding to the types of shelves may also be provided in this embodiment, and then a shelf can be transported to a corresponding operation door according to a corresponding relationship between the types of shelves and the types of operation doors, so that a user outside operates a corresponding compartment.

Figure 5:
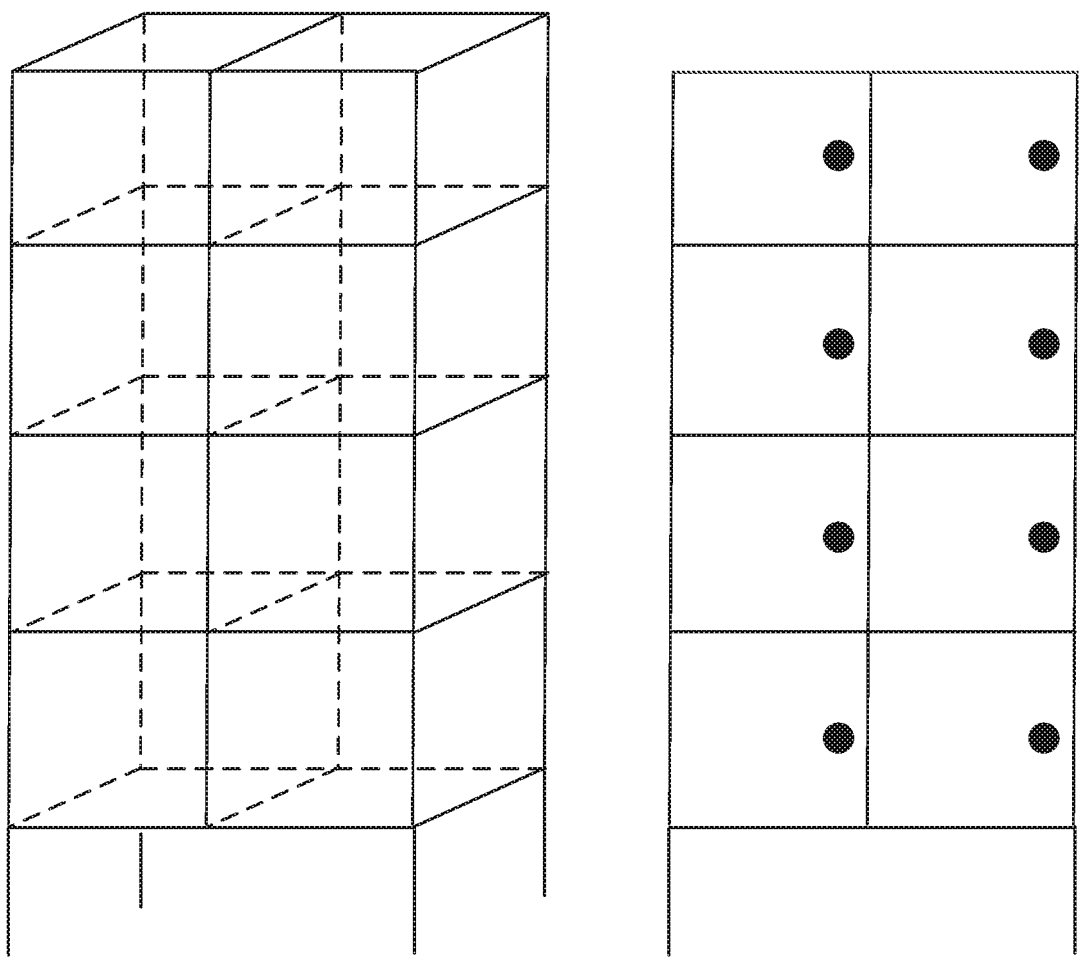
FIG. 5 is an exemplary diagram of a shelf and an operation door matched therewith provided in Embodiment I of the present application.

Exemplarily, FIG. 5 is an exemplary diagram of a shelf and an operation door matched therewith. It can be seen from the figure that the shelf on the left side of FIG. 5 includes 8 compartment doors with a structure of 2×4, and the operation door on the right side of FIG. 5 matching the shelf also includes 8 compartment doors with a structure of 2×4. Hence, when the shelf is aligned behind the operation door, each compartment door controls open and closed states of the compartment door corresponding to the compartment door with respect to the outside.

In this embodiment, the article operation instruction refers to an instruction input by a user through an interaction window in a user interaction zone, a portable device (PAD), an application (APP) or the like, and is used, in an unmanned access scenario for example, to control the retrieval of an articles from a storage container in the storage zone or the storage of an articles into a storage container in the storage zone. In an embodiment, the article operation instructions may include article storage instructions and article retrieval instructions, and the control server performs operations such as information processing and task generation according to different instructions. The control server is configured to store and control a storage state in the storage zone, and issue a control instruction to a robot or operation door or other device according to a user instruction to perform a corresponding transport or operation task.

In an embodiment, when the control server receives the article operation instruction, the control server determines, based on information contained in the article operation instruction, an operable storage container as a target storage container according to storage information of each storage container, and determines an operation door closest to the target storage container as a target operation door, and generates a transport instruction and transmits the transport instruction to a robot. Then, the robot transports the target storage container to the target operation door according to the transport instruction, and places a plurality of compartments on the target storage container in one-to-one correspondence with a plurality of compartments on the target operation door respectively. Finally, the control server controls a compartment door of a target compartment on the target operation door to open, where the target compartment on the target operation door is a compartment corresponding to a compartment associated with an article to be operated on the target storage container, to facilitate an article operation on the target storage container. In an unmanned access scenario, it allows to only open a compartment door corresponding to a compartment where a target article is located, so that a user can get the target article in the compartment. Storage can be performed in batches. That is, the control server determines a target storage container for storing an article and a target operation door, and a robot transports the target storage container to the target operation door, with a plurality of compartments on the target storage container being in one-to-one correspondence with a plurality of compartments on the target operation door respectively, and the control server controls all the compartments on the target operation door to open, to facilitate the user storing articles into the storage container at a time.

Exemplarily, when receiving an article operation instruction, the control server judges the article operation instruction according to information included in the article operation instruction. When the article operation instruction is determined to be an article storage instruction including target article information, if all storage containers in the current storage zone are empty, the control server can determine any storage container as the target storage container, and store the target article according to a classification. If some of the storage containers in the current storage zone are empty, storage containers having vacant storage spaces are used as candidate storage containers. As corresponding articles are still stored in part of the storage spaces of the storage containers, in order to unify the storage rules of the articles currently in the storage containers and prevent the articles from being randomly placed under the storage rule, the control server can, based on storage information and target article information at previous time, select from the candidate storage containers a storage container with a vacant storage space where the type of target article was stored as a target storage container. Correspondingly, the control server can also determine, according to the distance between the target storage container and each operation door respectively, an operation door closest to the target storage container as a target operation door. In addition, when determining that the article operation instruction is an article retrieval instruction including target article information, the control server determines a storage container loaded with a target article as a target storage container according to the target article information. Correspondingly, the control server can also determine, according to the distance between the target storage container and each operation door, an operation door closest to the target storage container as a target operation door.

Therefore, the control server generates a transport instruction for transporting the target storage container to the target operation door according to the determined target storage container and target operation door. In this embodiment, the control server can generate a navigation route from the position of the target storage container to the position of the target operation door according to the position of the target storage container, the position of the target operation door, and current storage information of the storage zone, and can also assign a robot for executing the transport operation, generate a transport instruction including information such as the target storage container, the navigation route, and the assigned robot, and issue the transport instruction to the assigned robot.

In addition, to save the space cost caused by excessive storage space in the foregoing various application scenarios, a "mini warehouse" is used in this embodiment to store articles. Correspondingly, as the space in the storage zone is small, the storage containers in the storage zone are arranged in a dense storage mode in this embodiment. That is, the storage containers in the storage zone are densely placed together, and at least part of the storage containers in the storage container are blocked storage containers, the peripheries of the blocked storage containers are surrounded by other storage containers, thereby reducing excessive occupation of the storage space by other things than the storage containers as much as possible, and increasing the occupation rate of the storage containers in the storage zone. When the control server plans a navigation route, it needs to consider whether the target shelf is blocked. If determining that the target storage container is not a blocked storage container, the control server can directly generate the aforementioned transport instruction to a robot, control the first robot of the at least one robot to transport the target storage container to the target operation door; if determining that the target storage container is a blocked storage container, the control server needs to determine the number of blocked shelves according to the current storage information in the storage zone, and generate a blocked shelf transport instruction to control at least one second robot of the at least one robot to first move away at least one storage container blocking the target storage container according to certain rules, such as the Klotski principle, so that at least one side of the periphery of the target storage container is not surrounded by other storage containers, and then control the first robot to transport the target storage container to the target operation door, generate a more complicated transport instruction, and transmit the more complicated transport instruction to an assigned robot.

Figure 6:
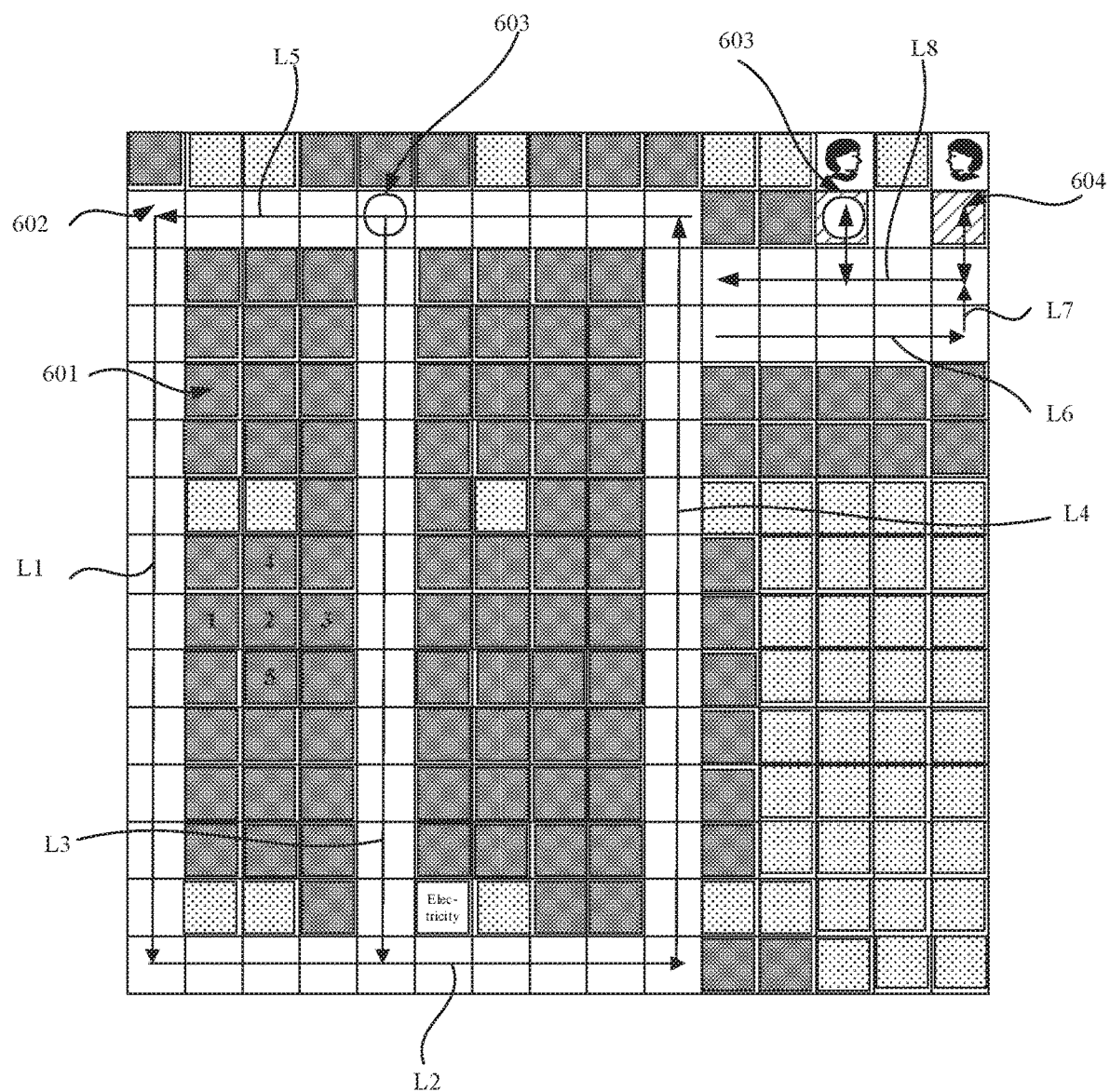
FIG. 6 is a schematic diagram of shelf layout and transport in a dense storage mode provided in Embodiment I of the present application.

In an embodiment, FIG. 6 is a schematic diagram of shelf layout and transport in a dense storage mode. As shown in FIG. 6, using a shelf as an example, a shelf zone 601, a robot traveling passage 602, robots 603, and an operation door 604 are respectively provided. A plurality of shelves are provided in the shelf zone 601. The shelves in the shelf zone 601 can be placed in a single row, such as the shelves placed in a single-row shown in the upper end of FIG. 6. The shelves can also be placed in multiple rows (at least two rows) side by side, such as the 3 rows of shelves at the left side and the 4 rows of shelves in the middle in FIG. 6. The robot traveling passage 602 in FIG. 6 can include a traveling sub-passage L1, a traveling sub-passage L2, a traveling sub-passage L3, a traveling sub-passage L4, a traveling sub-passage L5, a traveling sub-passage L6, a traveling sub-passage L7, and a traveling sub-passage L8. The above-mentioned traveling sub-passages are all unidirectional traveling passages, and one or both sides of each of the traveling sub-passages adjoin part of the shelves in the storage zone 601. The robot 603 can move in a direction indicated by at least one of the traveling sub-passages of the robot driving path 602 to a position where each shelf is located to transport the shelf.

Figure 7:
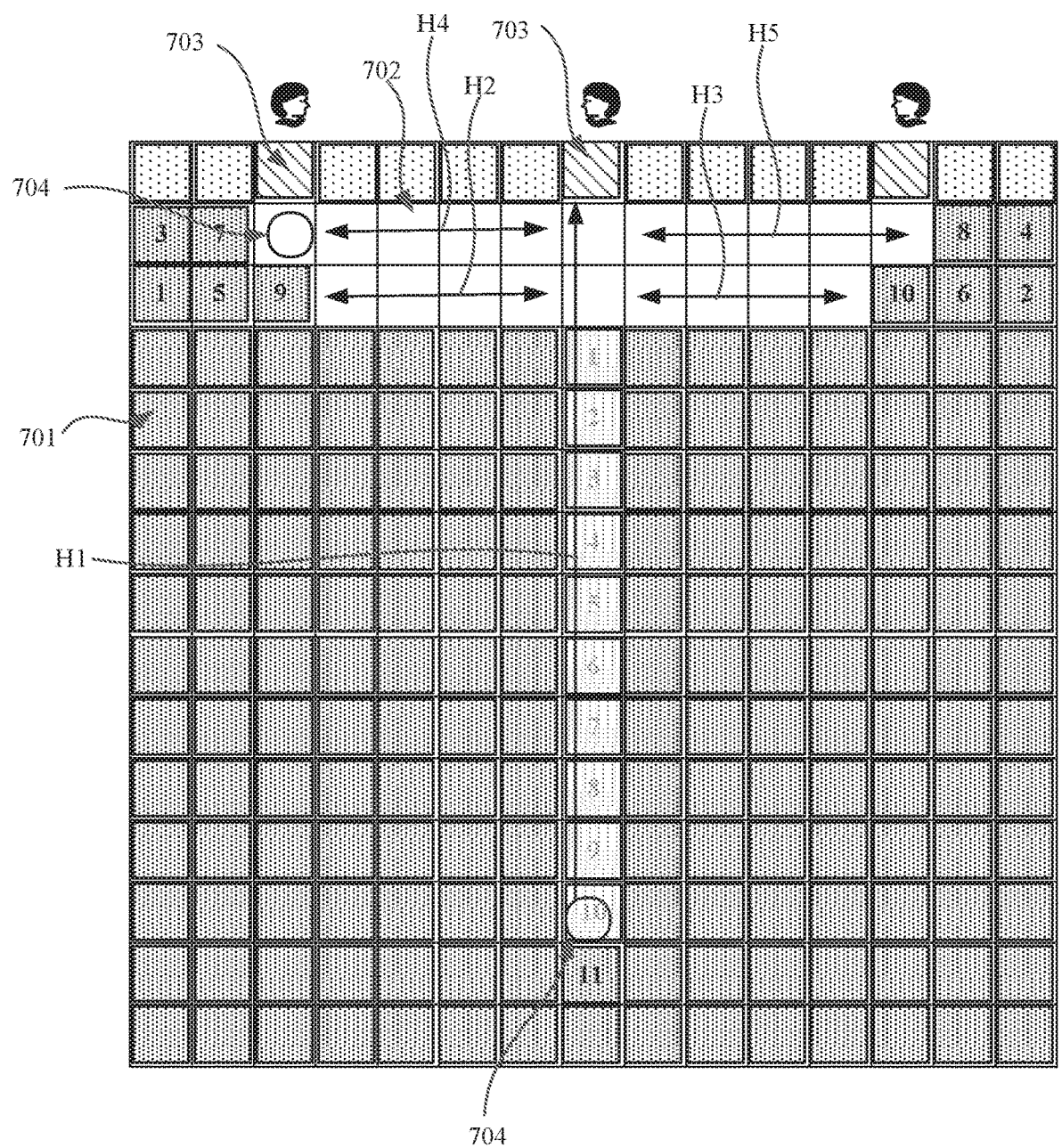
FIG. 7 is a schematic diagram of a shelf layout and transport in another dense storage mode provided in Embodiment I of the present application.

In an embodiment, FIG. 7 is a schematic diagram of shelf layout and transport in another dense storage mode. As shown in FIG. 7, also using a shelf as an example, a shelf zone 701, a temporary shelf placement zone 702, operation doors 703, and robots 704 are provided respectively. There are a plurality of shelves in the shelf zone 701. The plurality of shelves in the shelf zone 701 are densely distributed on a side of the storage zone. There is no robot traveling passage between the plurality of shelves. The temporary shelf placement zone 702 is only provided in an area of the warehouse (a side of the storage zone shown in FIG. 7, for example), and a robot 704 can transport a shelf to the temporary shelf placement zone 702.

For example, when the control server receives an article retrieval instruction, the control server determines a shelf loaded with a target article as a target shelf according to current storage information of the storage zone and target article information associated with the article retrieval instruction, and determines an operation door matched with and closest to the target shelf as a target operation door. Then a transport instruction for transporting the target shelf to the target operation door is generated. In an embodiment, if the shelves in the storage zone adopt a dense storage mode, and assuming that the target shelf is a shelf 1 in FIG. 6, which is not a blocked shelf, then a navigation route from the left of shelf 1 along unidirectional passages L1, L2, L4, L6 and L7 to the operation door 604 may be planned, and thereby generating a transport instruction. If it is assumed that the target shelf is a shelf 2 in FIG. 6, which is a blocked shelf, then the shelf 2 is blocked by shelves such as shelves 1, 3, 4 and 5, resulting in blockage of the transport passage from shelf 2 to operation door 604. Therefore, it can plan a navigation route from the right side of the shelf 3 along unidirectional passages L3, L2, L4, L5 and L3 to move the shelf 3 in a circle and transport it back to the original position of the shelf 3, and at the same time, it can plan, after the shelf 3 is transported, a navigation route from the original position of the shelf 3 along unidirectional passage L3, L2, L4, L6 and L7 to the operation door 604 to transport the target shelf 2, so as to allocate assigned robots to the two navigation routes, generate transport instructions and transmit the instructions to the assigned robots.

Exemplarily, to transport densely stored shelves, a navigation route based on the Klotski principle may alternatively be adopted, which is planned to use the least paths to transport a target shelf to a target operation door. In an embodiment, if the shelves in the storage zone adopt a dense storage mode, and assuming that the target shelf is a shelf 11 in FIG. 7, which is a blocked shelf, a navigation route can be planned for transporting shelves such as 1, 2, . . . 10 sequentially by a plurality of robots to the temporary storage zone 702 along a passage H1 in combination with a passage H2, H3, H4 or H5, and then a navigation route for transporting the target shelf 11 to the operation door 703 along the passage H1, so as to allocate assigned robots for the plurality of navigation routes, generate transport instructions and transmit the transport instructions to the assigned robots.

In a specific embodiment of the present application, according to a transport instruction issued by the control server, a robot transports the target storage container to the target operation door along a navigation route in the transport instruction. When performing autonomous navigation, the robot can perform a corresponding transport task according to one or a combination of at least two navigation modes of the following: two-dimensional code navigation, inertial navigation, visual navigation, and sensor navigation.

In an embodiment, there may be one robot or a plurality of robots that receive a transport instruction. According to the transport instruction, if the target storage container is not a blocked storage container, the robot can directly transport the target storage container to the target operation door according to the navigation route, and one robot can accomplish the transport task. If the target storage container is a blocked storage container, at least two robots are required to cooperatively transport based on the number of blocking storage containers, and based on the Klotski principle and/or the unidirectional passage principle, at least one second robot is controlled to move away at least one storage container blocking the target storage container along a navigation route, so that at least one side of the periphery of the target storage container is not surrounded by other storage containers, and then a first robot is controlled to transport the target storage container to the target operation door. Then, the target storage container can be aligned with the target operation door based on a sensor or vision, so that each compartment door in the target operation door can control the opening and closing of the compartment corresponding to a compartment door in the target storage container with respect to the outside.

In a specific embodiment of the present application, after a plurality of compartments on the target storage container are respectively aligned in one-to-one correspondence with a plurality of compartments on the target operation door, the control server can control the opening and closing of one or more compartment doors in the target operation door, so as to expose, by opening at least one compartment door, at least one corresponding compartment of the target storage container behind the compartment door. When the target storage container is aligned with the target operation door, a robot can send a transport completion instruction to the control server, thereby exciting the control server to issue an instruction for subsequently opening the compartment door, or by using an apparatus such as a sensor or the like on the operation door, when the operation door detects that a storage container is aligned therewith, the operation door transmits a transport completion instruction to the control server, thereby exciting the control server to issue an instruction for subsequently opening the compartment door. In view of the fact that when determining the target storage container, the control server has determined the position of at least one storage space where a target article should be stored or taken out, such as the position of a compartment of a shelf, the control server further determines corresponding at least one compartment door according to the position of the at least one storage space, thereby controlling the at least one compartment door to open. Correspondingly, the user can operate the storage space corresponding to the open compartment.

There are various ways to open a compartment door in an operation door in this embodiment. In an embodiment, a compartment door may be opened under the control of the control server; or each compartment door may be provided with an indicator light, and the control server controls the indicator light to be turned on or off to prompt the user to open the corresponding compartment door; or the control server may send verification information, such as a password, to a device through which the user inputs an article operation instruction to the control server, and after the user performs verification at the operation door based on the received verification information, he can open corresponding at least one compartment door. This embodiment does not limit an opening method of the compartment door in the operation door, and any opening method that can achieve opening and ensure the safety of the user and article can be applied in this embodiment.

In addition, the system in this embodiment can further include an operation quantity monitoring device. After the control server controls a compartment door in the target operation door to open to expose the target storage container through the open target compartment door, the control server can monitor, through the operation quantity monitoring device, the quantity of the target article taken out from or stored in the target storage container, to determine an operation quantity of the target article. In an embodiment, by using radio frequency identification technology, a radio frequency identification (RFID) tag is scanned to determine the quantity of the operated article, or based on visual identification technology, a monitored image is acquired by a camera to determine the quantity of the article. Then, an operating position of the target article is determined according to an open/closed state of the target storage container and a compartment door in the operation door, and storage information of the storage container is updated according to the target article, the operation quantity, and the operation position. Furthermore, based on the above-mentioned determination of the operation quantity of the article, in some transaction scenarios, such as an unmanned supermarket scenario, if the article operation instruction is an article sales instruction, it indicates that the user is buying a corresponding article, so an article transaction amount is determined according to the type and sales quantity of the target article, and the article transaction amount is transmitted to a transaction server, so that the transaction server can deduct the corresponding article transaction amount from a user's account according to a payment mode bound by the user.

Figure 8:
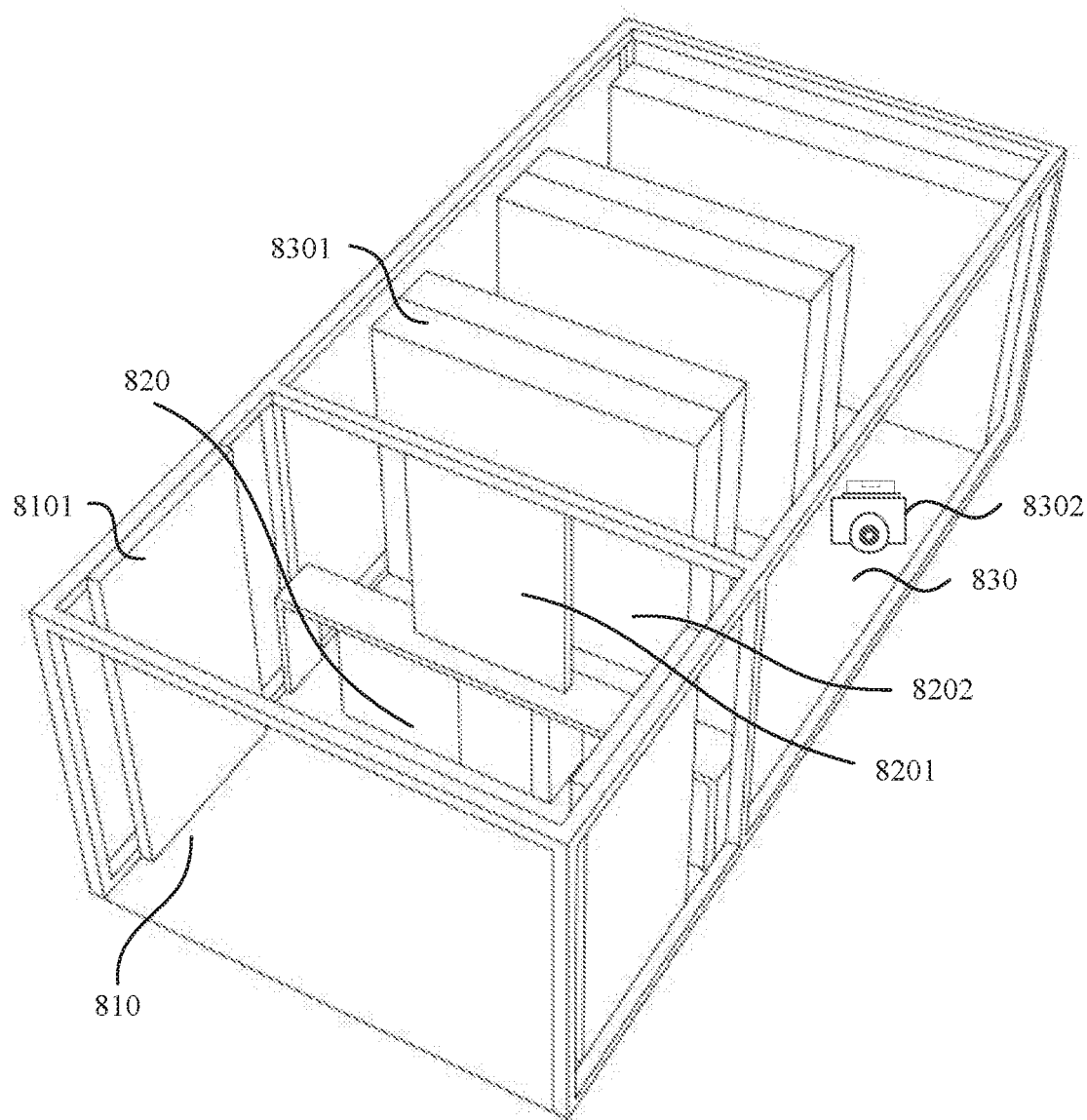
FIG. 8 is a rendering effect diagram of an operation door provided in Embodiment I of the application applied in an unmanned shoe sales scenario.

Exemplarily, FIG. 8 is a rendering effect diagram of an operation door applied to an unmanned shoe sales scenario. As shown in FIG. 8, using a shelf as an example, dense storage of operation doors and shelves is applied to a self-service shoe purchase scenario, in which a self-service shoe trying zone 810, an interaction zone 820, and a storage zone 830 are provided. Sample shoes 8101 for users to try are provided on a wall of the left side of the self-service shoe trying zone 810 in advance; an interaction window 8201 and an operation door 8202 are provided in the interaction zone 820; and shelves 8301 and a robot 8302 are provided in the storage zone 830, and stored shoes are stored on the shelves 8301. The shelves 8301 can adopt a dense storage mode to improve the storage utilization of the storage zone 830. Popularity ranking is performed according to the hit rates of articles. For example, more people need shoes with size 36 in the market, and thus a shelf 8301 storing the shoes with size 36 are preferentially placed at a position closest to the interaction zone 820. Thus, when a user needs shoes with size 36, the shelf where the assigned shoes are located is transported as soon as possible.

In the above example, when a user buys shoes in a self-service manner, the user tries on sample shoes 8101 in the self-service shoe trying zone 810 to select target shoes that he wants to purchase, and inputs information of the target shoes that he wants to purchase through the interaction window 8201 in the interaction zone 820 to form an article sales instruction. Correspondingly, the control server controls the robot 8302 to transport a target shelf 8301 containing the target shoes to the operation door 8202 in the interaction zone 820 according to the article sales instruction, and controls a compartment door corresponding to a compartment where the target shoes are located to open. Then, the server monitors, by the operation quantity monitoring device, the quantity of the target shoes taken by the user to determine the quantity of the target shoes taken out, and generates a deduction amount according to a unit price of the target shoes and transmits the deduction amount to the transaction server. After the user takes out the shoes, the transaction server deducts a corresponding amount from an account bound by the user. Correspondingly, when some or all of the shoes in the storage zone 830 are purchased, a working person needs to perform a corresponding loading task. Correspondingly, the control server controls the robot 8302 to transport a loading shelf to the operation door 8202, and opens compartment doors corresponding to vacant compartments, or open all compartment doors when all goods have been purchased, so that the working person can load goods to the shelves 8301 at a time, without a person walking among shelves and performing loading operations one by one, so the number of required working persons is reduced, and the loading efficiency of the working persons is greatly improved.

The technical solution of this embodiment uses an unmanned operating system composed of a control server, an operation door, a robot, and a storage container, where the control server is configured to, in response to a received article operation instruction, determine a target storage container and a target operation door for an article to be operated, and transmit a transport instruction to a robot; the robot transports the target storage container to the target operation door according to the transport instruction; and the control server controls the opening and closing of a compartment door of a target compartment on the target operation door, to perform an article operation at the target storage container. In the embodiment of the present application, a fixed storage container is moved, and an operation door is provided in the interaction zone; and a storage container is transported to the operation door, and is operated according to an open/closed state of the compartment doors on the operation door corresponding to one or more compartments in the storage container, so that automated unmanned operations according to external needs are achieved, and the storage container in the storage zone can be operated manually at a time, thus reducing labor costs and improving the operation efficiency of articles.

Embodiment II

Figure 9:
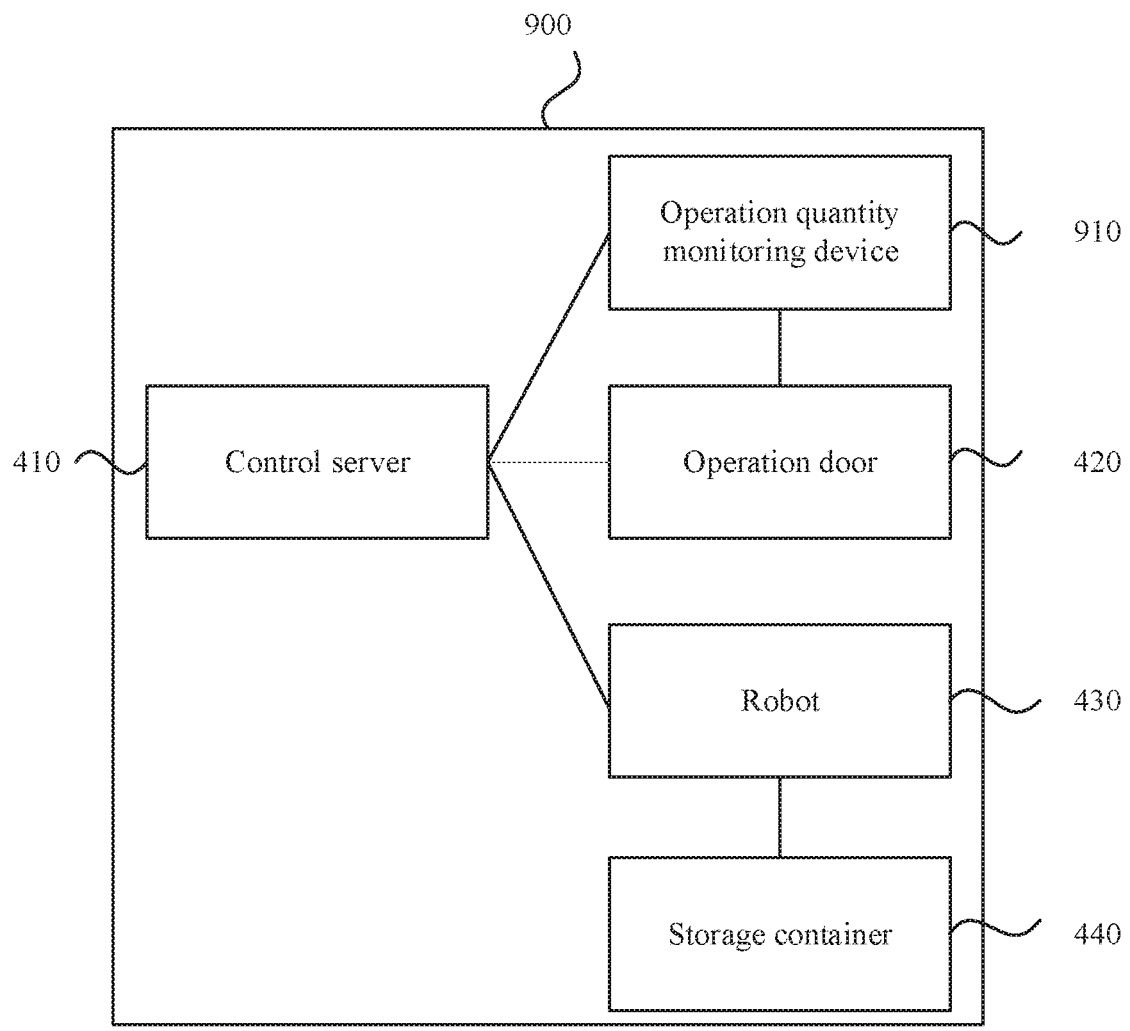
FIG. 9 is a structural block diagram of a self-service operating system provided in Embodiment II of the present application.

Based on the foregoing Embodiment I, this embodiment provides an optional implementation of a self-service operating system, which can monitor an operation status of a user and timely and accurately update storage information. FIG. 9 is a structural block diagram of a self-service operating system provided in Embodiment II of the present application. As shown in FIG. 9, the system 900 includes an operation quantity monitoring device 910, where the operation quantity monitoring device 910 is configured to perform quantity monitoring on an article to be operated, and the operation quantity monitoring device 910 is communicatively connected with a control server 410; the system 900 includes one or more operation doors 420; the operation door 420 is provided with one or more target compartments; at least part of the storage containers 440 is a blocked storage container, and the periphery of the blocked storage container is surrounded by other storage containers; and the control server 410 is further configured to adjust the position of the storage container according to the popularity of one or more types of articles in the storage container 440.

The control server 410 is configured to, in response to an article operation instruction, determine a target storage container 440 and a target operation door 420 corresponding to an article to be operated, and transmit a transport instruction to a robot 430.

The robot 430 is configured to, in response to the transport instruction, transport the target storage container 440 to the target operation door 420, where a plurality of compartments on the target storage container 440 are in one-to-one correspondence with a plurality of compartments on the target operation door 420.

The control server 410 is further configured to control a compartment door of a target compartment on the target operation door 420 to open, the target compartment on the target operation door 420 being a compartment corresponding to a compartment on the target storage container 440 associated with the article to be operated, to perform an article operation on the target storage container 440.

In a specific embodiment of the present application, when the control server receives the article operation instruction, the control server determines, based on information contained in the article operation instruction, a storage container where a target article can be stored or taken out as a target storage container according to storage information of each storage container, and determines an operation door closest to the target storage container as a target operation door, and generates a transport instruction and transmits the transport instruction to a robot. Then, the robot transports the target storage container to the target operation door according to the transport instruction, and places a plurality of compartments on the target storage container in one-to-one correspondence with multiple compartments on the target operation door respectively. Finally, the control server controls a compartment door of a target compartment on the target operation door to open, where the target compartment on the target operation door is a compartment corresponding to a compartment where an article to be operated is located on the target storage container, to facilitate an article operation on the target storage container. When an article is to be taken out, it is possible to only open a compartment door corresponding to a compartment where a target article is located, so that a user can get the target article in the compartment. Storage can be performed in batches. That is, the control server determines a target storage container for storing an article and a target operation door, and a robot transports the target storage container to the target operation door, where a plurality of compartments on the target storage container are in one-to-one correspondence with a plurality of compartments on the target operation door respectively, and the control server controls all the compartment doors on the target operation door to open, to facilitate the user storing articles into the storage container at a time.

Exemplarily, when receiving an article operation instruction, the control server judges the article operation instruction according to information included in the article operation instruction. When the article operation instruction is determined to be an article storage instruction including target article information, if all storage containers in the current storage zone are empty, the control server can determine any storage container as a target storage container, and store the target article according to a classification. If some of the storage containers in the current storage zone are empty, storage containers having vacant storage spaces are used as candidate storage containers. As corresponding articles are still stored in part of the storage spaces of the storage containers, in order to unify the storage rules of the articles currently in the storage containers and prevent the articles from being randomly placed under the storage rule, the control server can, based on storage information and target article information at previous time, selected from the candidate storage containers a storage container with a vacant storage space where the type of target article was stored as a target storage container. Correspondingly, the control server can also determine, according to the distance between the target storage container and each operation door, an operation door closest to the target storage container as a target operation door. In addition, when determining that the article operation instruction is an article retrieval instruction including target article information, the control server determines a storage container loaded with a target article as a target storage container according to the target article information. Correspondingly, the control server can also determine, according to the distance between the target storage container and each operation door, an operation door closest to the target storage container as a target operation door.

Optionally, if the system 900 includes a plurality of operation doors 420, the control server 410 is configured to determine the target storage container 440 according to a storage container associated with the article to be operated indicated in the article operation instruction, and determine the target operation door 420 according to distances between the target storage container 440 and the plurality of operation doors 420.

In a specific embodiment of the present application, when a plurality of operation doors are included in the system, as the relative positional relationship between each storage container and each operation door in the storage zone is different, based on the principle of optimal efficiency, when the target storage container is determined, an operation door closest to the target storage container and in a vacant state is determined as the target operation door to improve the efficiency of transporting the target storage container to the operation door, and further improve the operation efficiency of the article.

Optionally, the control server 410 is further configured to determine an operation quantity according to a monitoring result, and update storage information of the storage container according to the operation quantity.

In a specific embodiment of the present application, the operation quantity monitoring device 910 configured in the system can monitor the quantity of the operated article. In this embodiment, by using radio frequency identification technology, the quantity of the operated article is determined by the number of times of scanning a radio frequency identification (RFID) tag by a user; or based on visual identification technology, a monitored image is acquired by a camera to identify and determine the quantity of the operated article. Thus, the control server determines an operation quantity according to a monitoring result, and updates storage information of the storage container according to the operation quantity to ensure the correctness of the article operation in the unmanned operating system, and guarantee the interest of the user and the safety of the article in the storage zone.

Optionally, if the article operation instruction is an article sales instruction, the control server 410 is configured to determine an article transaction amount according to the type and sales quantity of an article, and transmit the article transaction amount to the transaction server, so that the transaction server deducts the article transaction amount from a user's account according to a payment mode bound by the user.

In a specific embodiment of the present application, in some transaction scenarios, such as an unmanned supermarket scenario, if the article operation instruction is an article sales instruction, it indicates that the user is buying a corresponding article, so the user who takes out the article should pay an amount of money as a feedback. The corresponding control server determines, based on the type and take-out quantity of the target article, an article transaction amount according to a product of a unit price and the quantity, and transmits the article transaction amount to a transaction server, so that the transaction server can deduct the corresponding article transaction amount from a user's account according to a payment mode bound by the user.

In the technical solution of this embodiment, a control server determines a target storage container and a target operation door according to different article operation instructions, controls a robot to transport the target shelf to the target operation door, so that the control server controls a compartment door in the target operation door to open so as to perform an article operation on the target storage container. In this process, the operation quantity of the article is monitored, and at the same time, the control server updates storage information of the storage container based on the determined operation quantity. In the embodiment of the present application, a fixed storage container is moved, and an operation door is provided in the interaction zone; and a storage container is transported to the operation door, and is operated according to an open/closed state of the compartment door in the operation door, so that automated unmanned operations according to external needs are achieved, and the storage container in the storage zone can be operated manually at a time, thus reducing labor costs and improving the operation efficiency of articles.

Embodiment III

Figure 10:
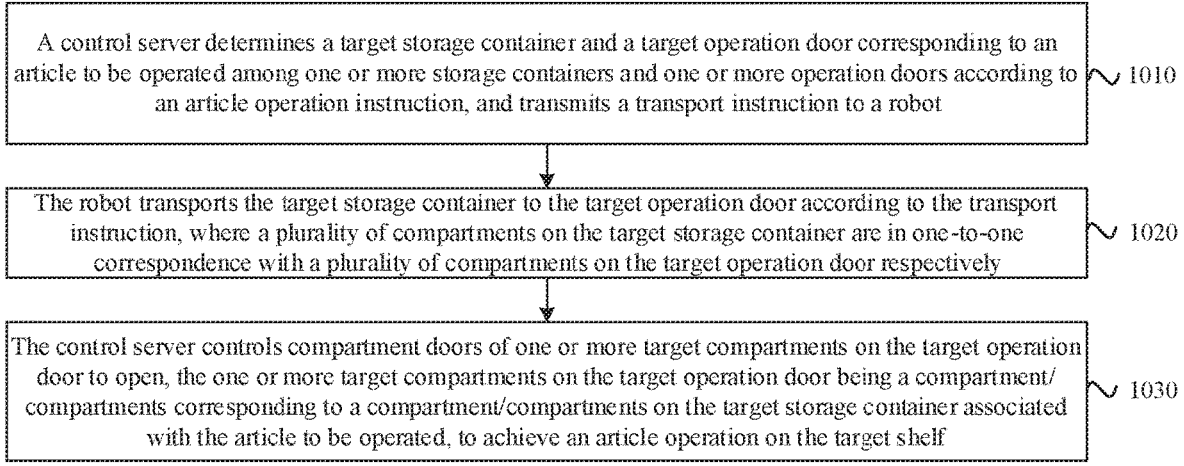
FIG. 10 is a flow diagram of a self-service operating method provided in Embodiment III of the present application.

FIG. 10 is a flow diagram of a self-service operating method provided in Embodiment III of the present application. This embodiment can be applied to a scenario of taking out an article from or storing an article to a storage container in a storage zone of a warehouse. The method can be executed by a self-service operating system. The method includes the following steps.

Step 1010: a control server determines a target storage container and a target operation door corresponding to an article to be operated among one or more storage containers and one or more operation doors according to an article operation instruction, and transmits a transport instruction to a robot;

In the embodiment of the present application, the control server receives an article operation instruction input by a user, and judges the type of the article operation instruction, that is, an article storage instruction or an article retrieval instruction. Then, the control server determines a target storage container and a target operation door according to the instruction of the specific use, and at the same time, plans a navigation route for a transport operation according to a storage manner of the storage zone, and assigns a robot performing the transport operation, thereby generates a transport instruction and transmit the transport instruction to the assigned robot.

In an embodiment, there may be one or more target storage containers, and there may be one or more target operation doors.

There are various ways to open a compartment door in an operation door in this embodiment. In an embodiment, a compartment door in the operation door may be opened under the control of the control server; or each compartment door may be provided with an indicator light, and the control server controls the indicator light to be turned on or off to prompt the user to open the corresponding compartment door; or the control server may send verification information, such as a password, to a device through which the user inputs an article operation instruction to the control server, and after the user performs verification at the operation door based on the received verification information, he can open corresponding at least one compartment door. This embodiment does not limit an opening method of the compartment door in the operation door, and any opening method that can achieve opening and ensure the safety of the user and article can be applied in this embodiment.

In different application scenarios, the specific reference of the compartment associated with the article to be operated is also different. For example, in an unmanned supermarket scenario, the compartment associated with the article to be operated refers to a compartment where a commodity for sale is located or a compartment where a replenishment commodity is racked; in an unmanned storage and retrieval scenario, the compartment associated with the article to operated refers to a compartment from which an article is taken out or a compartment into which an article is stored; and in a sorting scenario, the compartment associated with the article to operated refers to a compartment where an article is sorted or taken stock, or a compartment where a replenishment article is racked, etc.

Step 1020: the robot transports the target storage container to the target operation door according to the transport instruction, where a plurality of compartments on the target storage container are in one-to-one correspondence with a plurality of compartments on the target operation door respectively.

In a specific embodiment of the present application, according to a transport instruction issued by the control server, a robot transports the target shelf to the target operation door along a navigation route in the transport instruction, and aligns compartments in the target shelf with compartments in the target operation door, so that the plurality of compartments in the target shelf are in one-to-one correspondence with the plurality of compartment doors in the target operation door. When performing autonomous navigation, the robot can perform a corresponding transport task according to one or a combination of at least two navigation modes of the following: two-dimensional code navigation, inertial navigation, visual navigation, or sensor navigation.

Step 1030: the control server controls compartment doors of one or more target compartments on the target operation door to open, the one or more target compartments on the target operation door being a compartment/compartments corresponding to a compartment/compartments on the target storage container associated with the article to be operated, to achieve an article operation on the target shelf.

In a specific embodiment of the present application, after the target shelf is aligned with the target operation door, the control server can control the opening and closing of a target compartment door in the target operation door, so as to expose, by opening the compartment door in the operation door, the target shelf behind the compartment door, to facilitate an article operation on the target shelf by a user. In view of the fact that when determining the target storage container, the control server has determined the position of at least one compartment where a target article should be stored or taken out, then based on a corresponding relationship between compartments in the storage container and compartments of the operation door, the control server further determines corresponding at least one target compartment door according to the position of the at least one compartment, thereby controlling the at least one compartment door to open. Correspondingly, the user can operate the compartment corresponding to the open compartment.

According to the technical solution of this embodiment, the control server determines a target storage container and a target operation door according to a received article operation instruction, and sends a transport instruction including the target storage container and the target operation door to a robot; the robot transports the target storage container to the target operation door; and then the control server controls a target compartment door in the target operation door to open, so as to expose a compartment of the storage container through the target compartment door, and a user performs an article operation on the exposed compartment of the storage container. In the embodiment of the present application, a fixed storage container is moved, and an operation door is provided in the interaction zone; and a storage container is transported to the operation door, and is operated according to an open/closed state of the operation door, so that automated unmanned operations according to external needs are achieved, and the storage container in the storage zone can be operated manually at a time, thus reducing labor costs and improving the operation efficiency of articles.

Embodiment IV

Figure 11:
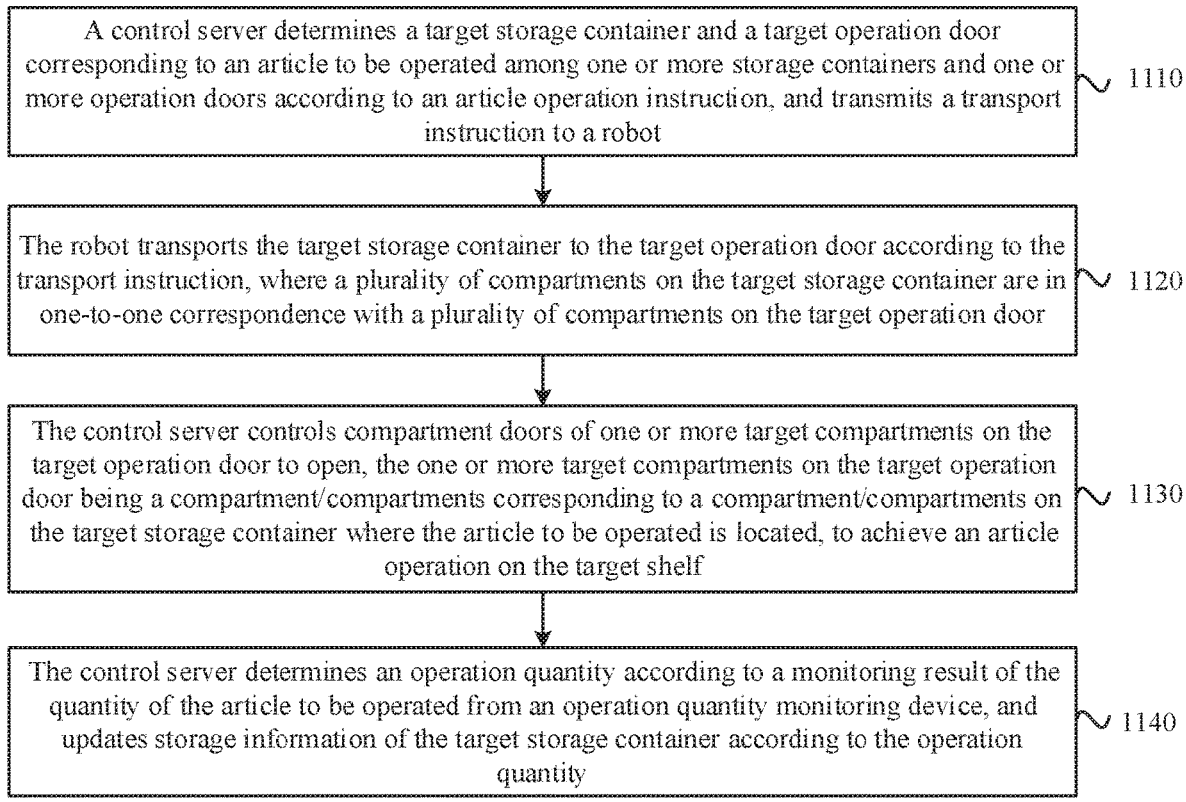
FIG. 11 is a flow diagram of a self-service operating method provided in Embodiment IV of the present application.

Based on the foregoing Embodiment III, this embodiment provides an optional implementation of a self-service operating method, which can monitor an operation status of a user and timely and accurately update storage information. FIG. 11 is a flow diagram of a self-service operating method provided in Embodiment IV of the present application. As shown in FIG. 11, the method includes the following steps.

Step 1110: a control server determines a target storage container and a target operation door corresponding to an article to be operated among one or more storage containers and one or more operation doors according to an article operation instruction, and transmits a transport instruction to a robot.

In a specific embodiment of the present application, the control server receives an article operation instruction input by a user, and judges the type of the article operation instruction, that is, an article storage instruction or an article retrieval instruction. Then, the control server determines a target storage container and a target operation door according to the instruction of the specific use, and at the same time, plans a navigation route for a transport operation according to a storage manner of the storage zone, and assigns a robot performing the transport operation, thereby generates a transport instruction and transmits the transport instruction to the assigned robot.

Optionally, there are one or more operation doors.

In this embodiment, to improve the operation efficiency of articles in the storage zone, all storage containers used in the storage zone are of a unified model or standard, and article operations can be performed by using one operation door in a small storage zone, where the one operation door can be applied to all storage containers in the storage zone. In a relatively large storage zone, to improve the operation efficiency of articles, a plurality of operation doors can be used. In the storage zone, completely same storage containers and operation doors can be used, or some storage containers are matched with some operation doors.

Optionally, if there are a plurality of operation doors, the control server determines the target storage container according to a storage container where the article to be operated indicated in the article operation instruction is located, and determines the target operation door according to distances between the target storage container and the plurality of operation doors.

In a specific embodiment of the present application, when a plurality of operation doors are included in the system, as the relative positional relationship between each storage container and each operation door in the storage zone is different, based on the principle of optimal efficiency, when the target storage container is determined, an operation door closest to the target storage container and in a vacant state is determined as the target operation door to improve the efficiency of transporting the target storage container to the operation door, and further improve the operation efficiency of the article.

Exemplarily, in this embodiment, in view of multiple situations for storing articles, if all storage containers in the current storage zone are empty, the control server can determine any storage container as the target storage container, and store the target article according to a classification. If some of the storage containers in the current storage zone are empty, storage containers having vacant compartments are used as candidate storage containers. As corresponding articles are still stored in part of the compartments of the storage containers, in order to unify the storage rules of the articles currently in the storage containers and prevent the articles from being randomly placed under the storage rule, the control server can, based on storage information and target article information at previous time, select from the candidate storage containers a storage container with a vacant compartment where the type of target article was stored as a target storage container. Correspondingly, the control server can also determine, according to the distance between the target storage container and each operation door and/or the position of the vacant compartment on the target storage container, an operation door that can correspond to the target storage container or the vacant compartment as a target operation door to improve the transport efficiency of storage container.

In this embodiment, when determining that the article operation instruction is an article retrieval instruction, the control server can search for a corresponding article and its position from the storage zone according to target article information contained in the instruction. When a plurality of target articles are stored in the storage zone, based on the principle of highest efficiency, a storage container where the target article closest to the operation door is located can be preferentially determined as a target storage container, and the corresponding operation door is a target operation door.

Optionally, the control server adjusts the position of the storage container according to popularity levels of one or more types of articles in the storage container.

In this embodiment, a popularity level of at least one storage container in the storage zone can be determined according to a hit rate of one or more types of articles in the at least one storage container; and then the position of the storage container in the storage zone is adjusted periodically according to the determined popularity level of the at least one storage container, to further improve the transport efficiency of the storage container where the articles are located.

Optionally, at least part of the plurality of storage containers are blocked storage containers, the peripheries of the blocked storage containers are surrounded by other storage containers.

In this embodiment, in order to save the space cost caused by excessive storage space in various application scenarios, a "mini warehouse" is used to store articles. Correspondingly, as the space in the storage zone is small, the storage containers in the storage zone are arranged in a dense storage mode in this embodiment. That is, the containers in the storage zone are densely placed together, and at least part of the storage containers in the storage container are blocked storage containers, the peripheries of the blocked storage containers are surrounded by other storage containers, thereby reducing excessive occupation of the storage space by other things than the storage containers as much as possible, and increasing the occupation rate of the storage containers in the storage zone.

Step 1120: the robot transports the target storage container to the target operation door according to the transport instruction, where a plurality of compartments on the target storage container are in one-to-one correspondence with a plurality of compartments on the target operation door.

In a specific embodiment of the present application, according to a transport instruction issued by the control server, the robot transports the target storage container to the target operation door along a navigation route in the transport instruction, and aligns the target storage container with the target operation door, so that a plurality of compartments in the target storage container are in one-to-one correspondence with a plurality of compartment doors in the target operation door. When performing autonomous navigation, the robot can perform a corresponding transport task according to one or a combination of at least two navigation modes of the following: two-dimensional code navigation, inertial navigation, visual navigation, or sensor navigation.

Optionally, if the control server determines that the target storage container is not a blocked storage container, then the control server controls a first robot to transport the target storage container to the target operation door; or if the control server determines that the target storage container is a blocked storage container, then the control server controls at least one second robot to move away at least one storage container blocking the target storage container so that at least one side of the periphery of the target storage container is not surrounded by other storage containers, and controls the first robot to transport the target storage container to the target operation door.

In this embodiment, if the storage containers in the storage zone are arranged in a dense storage mode, the storage containers in the storage zone are placed in a relatively concentrated manner with no or few passages therebetween, so the control server needs to control, according to the current storage manner and storage information of the storage zone, a robot to intelligently move out the target storage container, based on the principle of highest efficiency.

Step 1130: the control server controls compartment doors of one or more target compartments on the target operation door to open, the one or more target compartments on the target operation door being a compartment/compartments corresponding to a compartment/compartments on the target storage container where the article to be operated is located, to achieve an article operation on the target shelf.

In a specific embodiment of the present application, after the target shelf is aligned with the target operation door, the control server can control the opening and closing of the target operation door, so as to expose, by opening the operation door, the target shelf behind the operation door. In view of the fact that when determining the target shelf, the control server has determined the position of at least one compartment where a target article should be stored or taken out, the control server further determines corresponding at least one compartment door according to the position of the at least one compartment, thereby controlling the at least one compartment door to open. Correspondingly, the user can operate the compartment corresponding to the open compartment.

Optionally, there are one or more target compartments.

In this embodiment, if each of the storage container and the operation door matching the storage container includes a plurality of compartments or compartment doors, the number of the target compartments that can be determined when an article operation is performed can be one or more. That is, operation may be performed only on one compartment in the storage container, and correspondingly one compartment door on the operation control door is controlled to open; or a plurality of compartments in the storage container can be operated at the same time or at a time, and correspondingly a plurality of compartment doors on the operation door are controlled at the same time to open, or even all compartment doors on the operation door may be controlled to open.

There are various ways to open a compartment door in an operation door in this embodiment. In an embodiment, a compartment door in the operation door may be opened under the control of the control server; or each compartment door may be provided with an indicator light, and the control server controls the indicator light to be turned on or off to prompt the user to open the corresponding compartment door; or the control server may send verification information, such as a password, to a device through which the user inputs an article operation instruction to the control server, and after the user performs verification at the operation door based on the received verification information, he can open corresponding at least one compartment door. This embodiment does not limit an opening method of the compartment door in the operation door, and any opening method that can achieve opening and ensure the safety of the user and article can be applied in this embodiment.

In the embodiment of the present application, when the control server receives the article operation instruction, the control server determines, based on information contained in the article operation instruction, a storage container where a target article can be stored or taken out as a target storage container according to storage information of each storage container, and determines an operation door closest to the target storage container as a target operation door, and generates a transport instruction and transmits the transport instruction to a robot. Then, the robot transports the target storage container to the target operation door according to the transport instruction, and places a plurality of compartments on the target storage container in one-to-one correspondence with a plurality of compartments on the target operation door respectively. The control server controls compartment doors of one or more target compartments on the target operation door to open, the one or more target compartments on the target operation door being a compartment/compartments corresponding to a compartment/compartments on the target storage container where the article to be operated is located, to perform an article operation from the target storage container. When an article is to be taken out, it is possible to only open a compartment door corresponding to a compartment where a target article is located, so that a user can get the target article in the compartment. However, when an article is to be stored, storage can be performed in batches. That is, the control server determines a target storage container for storing an article and a target operation door, and a robot transports the target storage container to the target operation door, where a plurality of compartments on the target storage container are in one-to-one correspondence with a plurality of compartments on the target operation door respectively, and the control server controls all the compartments on the target operation door to open, to facilitate the user storing articles into the storage container at a time.

Exemplarily, when receiving an article operation instruction, the control server judges the article operation instruction according to information included in the article operation instruction. When the article operation instruction is determined to be an article storage instruction including target article information, if all storage containers in the current storage zone are empty, the control server can determine any storage container as the target storage container, and store the target article according to a classification. If some of the storage containers in the current storage zone are empty, storage containers having vacant compartments are used as candidate storage containers. As corresponding articles are still stored in part of the compartments of the storage containers, in order to unify the storage rules of the articles currently in the storage containers and prevent the articles from being randomly placed under the storage rule, the control server can, based on storage information and target article information at previous time, select from the candidate storage containers a storage container with a vacant compartment where the type of target article was stored as a target storage container. Correspondingly, the control server can also determine, according to the distance between the target storage container and each operation door, an operation door closest to the target storage container as a target operation door. In addition, when determining that the article operation instruction is an article retrieval instruction including target article information, the control server determines a storage container loaded with a target article as a target storage container according to the target article information. Correspondingly, the control server can also determine, according to the distance between the target storage container and each operation door, an operation door closest to the target storage container as a target operation door.

Step 1140: the control server determines an operation quantity according to a monitoring result of the quantity of the article to be operated from an operation quantity monitoring device, and updates storage information of the target storage container according to the operation quantity.

In the embodiment of the present application, after the control server controls a target compartment door to open to expose the target storage container through the target compartment door, the control server can monitor the quantity of the target article taken out from or stored in the target storage container, to determine an operation quantity of the target article. In an embodiment, by using radio frequency identification technology, an RFID tag is scanned to determine the quantity of the operated article, or the quantity of the article is determined based on visual identification technology.

Optionally, if the article operation instruction is an article sales instruction, the control server determines an article transaction amount according to the type and sales quantity of an article, and transmit the article transaction amount to the transaction server, so that the transaction server deducts the article transaction amount from a user's account according to a payment mode bound by the user.

In the embodiment of the present application, article operation instructions can generally include article storage instructions and article retrievals instruction. In a specific application scenario, an instruction can be classified according to an article operation mode, such as storage or retrieval, and can be assigned an instruction name in the specific scenario, such as an article sales instruction, which indicates taking out an article from a storage container. In this embodiment, in an unmanned supermarket scenario, if the article operation instruction is an article sales instruction, it indicates that the user is buying a corresponding article, so an article transaction amount is determined according to the type and sales quantity of the article, and the article transaction amount is transmitted to a transaction server, so that the transaction server can deduct the corresponding article transaction amount from a user's account according to a payment mode bound by the user. This prevents the user from taking more articles or less articles than he buys, and ensures the safety of the user and articles in the storage zones and the maintenance of benefits.

In the embodiment of the present application, the control server has a function of recording the storage information in the storage zone. For example, a storage information library is built to perform overall management of storage states of the storage containers and articles in the storage zone. Furthermore, after an article operation is performed at least once, the storage information library in the control server is updated timely based on the target article, operation quantity, and operation position in this embodiment, so as to accurately handle subsequent article operations.

According to the technical solution of this embodiment, the control server determines a target storage container and a target operation door according to a received article operation instruction, and sends a transport instruction including the target storage container and the target operation door to a robot; the robot transports the target storage container to the target operation door; and then the control server controls the target operation door to open, so as to expose the storage container through the target operation door, and a user performs an article operation on the exposed target storage container. Furthermore, an article operation quantity is monitored, and at the same time an operation position of the target article is determined according to an open/closed state of the target storage container and the operation door, and finally, storage information of the target article is updated according to the target article, the operation quantity, and the operation position. In the embodiment of the present application, a fixed storage container is moved, and an operation door is provided in the interaction zone; and a storage container is transported to the operation door, and is operated according to an open/closed state of the operation door, so that automated unmanned operations according to external needs are achieved, and the storage container in the storage zone can be operated manually at a time, thus reducing labor costs and improving the operation efficiency of articles.

Embodiment V

Figure 12:
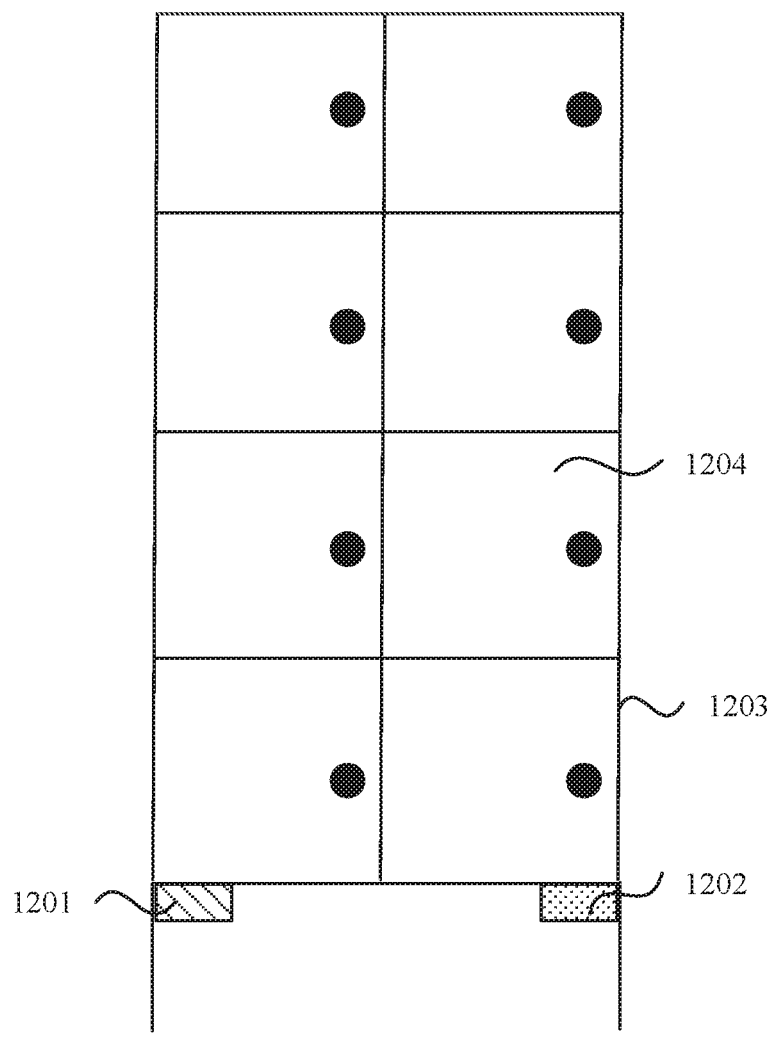
FIG. 12 is a schematic structural diagram of an operation door provided in Embodiment V of the present application.

FIG. 12 is a schematic structural diagram of an operation door provided in Embodiment V of the present application. This embodiment is applicable to a scenario where an article is taken out from or stored in a storage container in a storage zone of a warehouse. The operation door can be adapted to a self-service operating system in any embodiment of the present application to implements a self-service operating method in any embodiment of the present application. The operation door includes a control module 1201, a communication module 1202, a door frame 1203, and a door body 1204 connected with the door frame 1203, the door body 1204 having a plurality of compartments provided thereon, and the plurality of compartments being correspondingly provided with compartment doors respectively; and the communication module 1202 being in communication connected with a control server.

The communication module 1202 is configured to receive a control message sent by the control server, the control message indicating a compartment, a compartment door of which is to be opened, of the plurality of compartments.

The control module 1201 is configured to control, according to the control message, the compartment door of any one or more of the plurality of compartments to open.

In the embodiment of the present application, the operation door refers to a fixed spacer provided between a user and a storage container in a user interaction zone. As shown in FIG. 4, the operation door is communicatively connected with the control server in a wired or wireless manner, and receives a control instruction issued by the control server to perform an opening and closing operation of a compartment door in the operation door.

In an embodiment, the operation door at least can include a control module 1201, a communication module 1202, a door frame 1203, and a door body 1204 connected with the door frame 1203, and can further include a base, a sensor, a monitoring module and the like, which are not shown in the figure. The communication module 1202 is configured to transmit and receive signals to and from the control server, to ensure that the control module 1201 controls one or more compartments in the operation door according to a control message issued by the control server; the door frame 1203 is configured to fix a framework of each compartment door; and the door body 1204 is configured to control a storage container behind the operation door to be connected with or disconnected from the outside. In addition, the base is configured to support the entire operation door to ensure that the operation door stands stably in the interaction zone; the sensor is configured to detect whether a storage container is transported to the operation door; and the monitoring module is configured to monitor a user's operation process and an article operation quantity to ensure the safety of the user and articles in the storage zone.

It should be noted that, FIG. 12 only schematically illustrates the structure and function of the operation door, and does not limit the specific structure and function of the operation door.

In this embodiment, the interaction zone can include a plurality of operation doors, wherein each operation door includes at least one compartment door, and the opening and closing of each compartment door are controlled by the control server. When a storage container is placed behind the operation door, and at least one compartment door is open, the user can operate a compartment of the storage container corresponding to the compartment door.

In an embodiment, when performing an article storage operation on the storage container based on the operation door, after the robot transports the target storage container to the target operation door, the communication module in the operation door maintains a communicative connection with the control server, and receives a control message issued by the control server. Then, the communication module transmits the control message to the control module of the operation door; and the control module determines, based on the control message, a compartment, a compartment door of which is to be opened, of the plurality of compartments of the operation door, and controls, according to the control message, the compartment to open, thus controlling the opening and closing of one or more compartment doors in the target operation door.

Optionally, the door body 1204 can be opened or closed with respect to the door frame 1203.

In the embodiment of the present application, the door body is provided with a plurality of compartments, and the plurality of compartments are correspondingly provided with compartment doors respectively, where each compartment door can be opened or closed independently, and the entire door body can also be opened or closed relative to the door frame. Thus, when all the compartment doors in the operation door need to be opened, the entire door body can be controlled to open, to avoid the trouble of opening the compartment doors one by one, and further improve the operation efficiency of articles, especially for batch storage of articles.

In this embodiment, the door body or a compartment door in the door body of the operation door can be configured according to a specific structure of the storage container. In an embodiment, for such storage containers as a pallet or a bin, the door body of the operation door may be a doorway higher than the pallet or the bin, to facilitate an operation on an article located on the pallet or in the bin when the door body of the operation door is opened.

Figure 13:
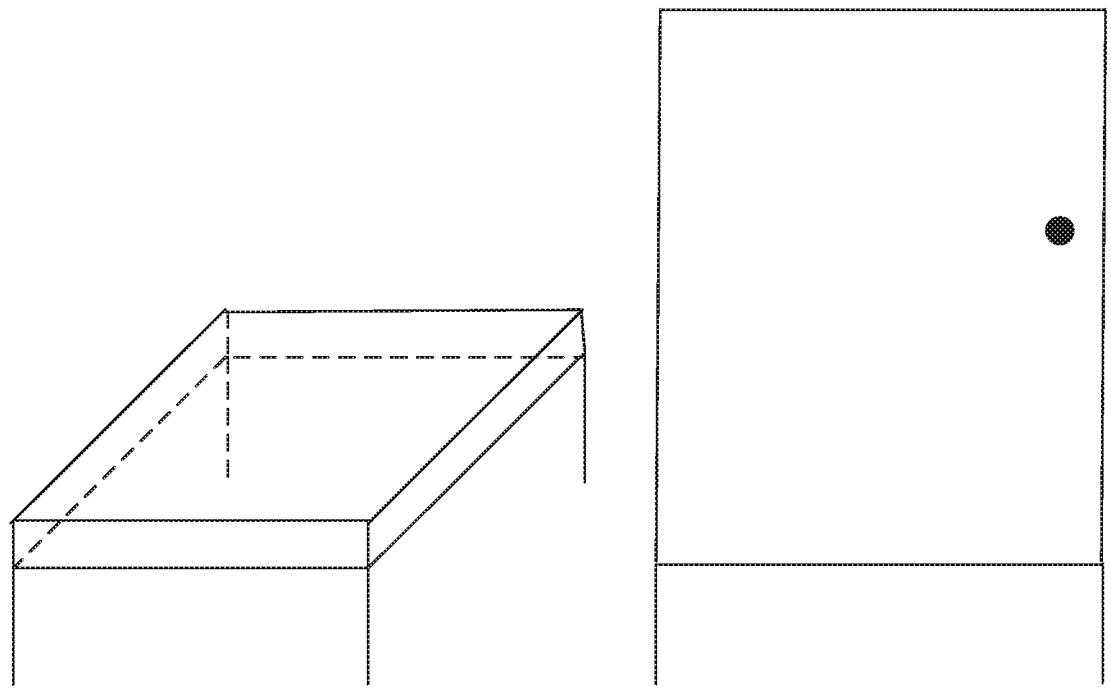
FIG. 13 is an exemplary diagram of a pallet and an operation door matched therewith provided in Embodiment V of the present application.
Figure 14:
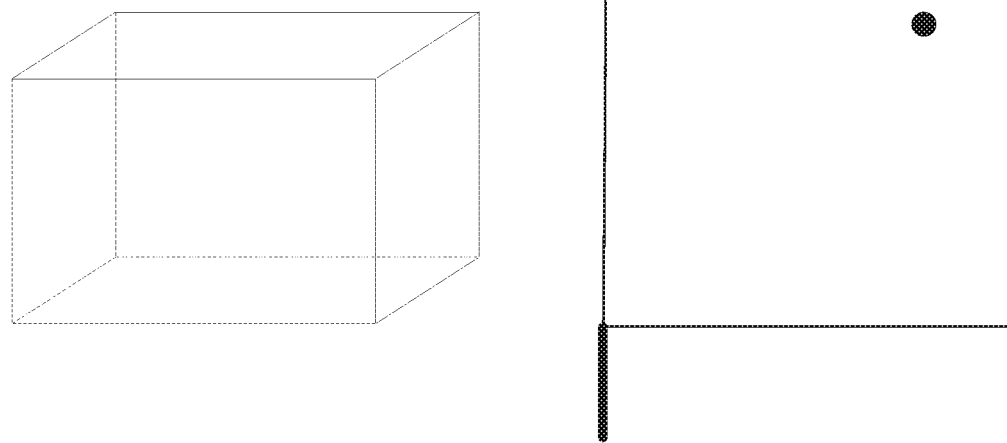
FIG. 14 is an exemplary diagram of a bin and an operation door matched therewith provided in Embodiment V of the present application.

In an embodiment, in view of the uniformity and universality of the operation door, pallets or bins of the same model can be used in the storage zone to ensure that each pallet or bin can correspond to the operation door. Exemplarily, FIG. 13 is an example diagram of a pallet and an operation door matched therewith, showing a schematic diagram of the pallet on the left portion of FIG. 13, and a schematic diagram of the operation door matching the pallet on the right portion of FIG. 13, where the operation door has only one door body. As an article is to be placed on the pallet, the corresponding operation door should be higher than the pallet. FIG. 14 is an example diagram of a bin and an operation door matched therewith, showing a schematic diagram of the bin on the left portion of FIG. 14, and a schematic diagram of the operation door matching the bin on the right portion of FIG. 14, where the operation door has only one door body. Similarly, as an article is to be placed in the bin, the user needs to operate the bin from top to bottom when operating the article, and thus the corresponding operation door should also be higher than the bin.

In addition, for such storage containers as a shelf, in an embodiment, the shelf and the compartment are configured based on a unified standard; that is, the sizes of different shelves, the configuration of their compartments, and the positions and sizes of the corresponding compartments are completely same. For a shelf with two open sides, the aforementioned unified standard is adopted on both sides of the shelf. Therefore, the shelves in this embodiment are completely same when no articles are placed thereon. Correspondingly, based on the size of the shelf and the same configuration, the operation door is provided with an independent compartment door configured for each compartment at a position corresponding to the compartment, on a plate material not smaller than the overall size of the shelf. Hence, each shelf in the storage zone can be transported to the back of the operation door and aligned with the operation door, such that the compartments capable of loading articles in the storage container correspond to the corresponding compartment doors in a one-to-one manner. Only when a compartment door is open can the user see and handle a compartment corresponding to the compartment door. Among the plurality of compartment doors, at least one can be opened under the control of the control module, or all of the compartment doors or the entire door body can be opened under the control of the control module. Optionally, multiple forms of storage containers and operation doors corresponding to the types of storage containers may also be provided in this embodiment, and then a storage container can be transported to a corresponding operation door according to a corresponding relationship between the types of storage containers and the types of operation doors, so that a user outside operates a corresponding compartment.

Exemplarily, FIG. 5 is an exemplary diagram of a shelf and an operation door matched therewith. It can be seen from the figure that the shelf on the left side of FIG. 5 includes 8 compartment doors with a structure of 2×4, and the operation door on the right side of FIG. 5 matched therewith also includes 8 compartment doors with a structure of 2×4. Hence, when the shelf is aligned behind the operation door, each compartment door controls open and closed states of the compartment door corresponding to the compartment door with respect to the outside.

It should be noted that, the above example only schematically illustrates the structure and function of the operation door, and does not limit the specific structure and function of the operation door.

Optionally, the operation door 420 is made of a transparent material.

In the embodiment of the present application, a transparent material may be used to fabricate an operation door. Correspondingly, before a user or a working person operates a storage container placed behind the operation door, he can learn about the article placed in the corresponding compartment of the storage container through the transparent operation door. Especially in such scenarios as in an unmanned supermarket, it facilitates a user clearly seeing and selecting or looking for an article he needs, or even viewing other physical articles for sale in the storage container through the transparent operation door in addition to purchasing the article, thereby increasing the possibility of purchase by the user and the sales rate of articles in the storage zone.

In the technical solution of this embodiment, an operation door is designed which is capable of interacting with a control server, and the display form thereof exactly corresponds to a corresponding storage container; the structure of the operation door is applied to a storage scenario, and a robot transports the storage container to the operation door, so that the originally fixed storage container is moved, and a passage between a storage zone and the outside world is provided through the structure of the operation door, so that a user can operate any storage container simply by standing at the operation door. Automated unmanned operations according to external needs are achieved, and the storage container in the storage zone can be operated manually at a time, thus reducing labor costs and improving the operation efficiency of articles.

The invention claimed is:

1. A self-service operating system, comprising a control server, one or more operation doors, at least one robot, and one or more storage containers, wherein the one or more storage containers are located in a storage zone, and the one or more operation doors are located in a user interaction zone which is at a side of the storage zone; the one or more operation doors and the at least one robot are respectively communicatively connected with the control server, and the one or more operation doors and the one or more storage containers are each provided with a plurality of compartments, the plurality of compartments on each of the storage containers respectively containing articles, and the plurality of compartments on each of the operation doors being correspondingly provided with compartment doors respectively, wherein when there is storage container is provided at a side of the operation door, the operation door serves as a fixed spacer between a user and the storage container at the side of the operation door, and a compartment door allows to be opened to enable the user to operate a compartment in the storage container behind the compartment door; wherein the control server is configured to, in response to an article operation instruction, determine a target storage container and a target operation door corresponding to an article to be operated, and transmit a transport instruction to a first robot of the at least one robot;

the first robot is configured to, in response to the transport instruction, transport the target storage container to the target operation door, wherein a plurality of compartments on the target storage container are in one-to-one correspondence with a plurality of compartments on the target operation door respectively; and the control server is further configured to control a compartment door of a target compartment on the target operation door to open, the target compartment on the target operation door being a compartment corresponding to a compartment on the target storage container associated with the article to be operated, to achieve an article operation on the target storage container.

2. The system according to claim 1, wherein the control server is configured to, in a case where the system comprises a plurality of operation doors, determine the target storage container according to a storage container associated with the article to be operated indicated in the article operation instruction, and determine the target operation door according to distances between the target storage container and the plurality of operation doors respectively.

3. The system according to claim 1, further comprising an operation quantity monitoring device configured to perform quantity monitoring on the article to be operated, wherein
the control server is further configured to determine an operation quantity according to a monitoring result, and update storage information of the target storage container according to the operation quantity.

4. The system according to claim 3, further comprising a transaction server, wherein the control server is further configured to, if the article operation instruction is an article sale instruction, determine an article transaction amount according to a type and sales quantity of an article, and transmit the article transaction amount to the transaction server; and the transaction server is configured to deduct the article transaction amount from a user's account according to a payment mode bound by the user.

5. The system according to claim 1, wherein at least part of the plurality of storage containers are blocked storage containers, and peripheries of the blocked storage containers are surrounded by other storage containers.

6. The system according to claim 5, wherein the control server is configured to:
if the target storage container is determined to be not a blocked storage container, control the first robot to transport the target storage container to the target operation door; or
if the target storage container is determined to be a blocked storage container, control at least one second robot of the at least one robot to move away at least one storage container blocking the target storage container so that at least one side of the periphery of the target storage container is not surrounded by other storage containers, and control the first robot to transport the target storage container to the target operation door.

7. The system according to claim 1, wherein the control server is further configured to adjust a position of the storage container according to popularity of one or more types of articles in the storage container.

8. A self-service operating method, comprising:
a control server determining a target storage container and a target operation door corresponding to an article to be operated among one or more storage containers and one or more operation doors according to an article operation instruction, and transmitting a transport instruction to a first robot, wherein among the one or more operation doors, when there is storage container is provided at a side of an operation door, the operation door serves as a fixed spacer between a user and the storage container at the side of the operation door, and a compartment door of a compartment in the operation door allows to be opened to enable the user to operate a compartment in the storage container behind the compartment door;

the first robot transporting the target storage container to the target operation door according to the transport instruction, wherein a plurality of compartments on the target storage container are in one-to-one correspondence with a plurality of compartments on the target operation door respectively; and the control server controlling compartment doors of one or more target compartments on the target operation door to open, the one or more target compartments on the target operation door being compartments corresponding to compartments on the target storage container associated with the article to be operated, to achieve an article operation on the target storage container.

9. The method according to claim 8, wherein the control server determining the target storage container and the target operation door corresponding to the article to be operated comprises:
in a case of a plurality of operation doors, the control server determining the target storage container according to a storage container associated with the article to be operated indicated in the article operation instruction, and determining the target operation door according to distances between the target storage container and the plurality of operation doors respectively.

10. The method according to claim 8, wherein after the control server controlling compartment doors of one or more target compartments on the target operation door to open, the one or more target compartments on the target operation door being compartments corresponding to compartments on the target storage container associated with the article to be operated, to achieve the article operation on the target storage, the method further comprises:
the control server determining an operation quantity according to a monitoring result of the quantity of the article to be operated from an operation quantity monitoring device, and updating storage information of the target storage container according to the operation quantity.

11. The method according to claim 10, wherein after the control server updating storage information of the target storage container according to the operation quantity, the method further comprises:
if the article operation instruction is an article sale instruction, the control server determining an article transaction amount according to a type and sales quantity of an article, and transmitting the article transaction amount to a transaction server, so that the transaction server deducts the article transaction amount from a user's account according to a payment mode bound by the user.

12. The method according to claim 8, wherein at least part of the plurality of storage containers are blocked storage containers, and peripheries of the blocked storage containers are surrounded by other storage containers.

13. The method according to claim 12, wherein the robot transporting the target storage container to the target operation door according to the transport instruction comprises:
if the control server determines that the target storage container is not a blocked storage container, the control server controlling the first robot to transport the target storage container to the target operation door; or if the control server determines that the target storage container is a blocked storage container, the control server controlling at least one second robot to move away at least one storage container blocking the target storage container so that at least one side of the periphery of the target storage container is not surrounded by other storage containers, and controlling the first robot to transport the target storage container to the target operation door.

14. The method of claim 8, further comprising:

the control server adjusting a position of the storage container according to popularity of one or more types of articles in the storage container.

15. An operation door, comprising a control module, a communication module, a door frame, and a door body connected with the door frame, the door body having a plurality of compartments provided thereon, and the plurality of compartments being correspondingly provided with compartment doors respectively; wherein when there is storage container is provided at a side of the operation door, the operation door serves as a fixed spacer between a user and the storage container at the side of the operation door, and a compartment door allows to be opened to enable the user to operate a compartment in the storage container behind the compartment door; and the communication module being in communication connected with a control server, wherein the communication module is configured to receive a control message sent by the control server, the control message indicating a compartment, a compartment door of which is to be opened, of the plurality of compartments; and the control module is configured to control, according to the control message, the compartment door of any one or more of the plurality of compartments to open.

16. The operation door according to claim 15, wherein the door body is openable or closable with respect to the door frame.

17. The operation door according to claim 15, wherein the operation door is made of a transparent material.

\* \* \* \* \*